(12) United States Patent
Hayama et al.

(10) Patent No.: US 6,225,778 B1
(45) Date of Patent: May 1, 2001

(54) BATTERY PACK

(75) Inventors: Hideki Hayama, Yokohama; Haruhiko Tanaka, Yachiyo; Ryuta Takeishi, Gunma-gun; Yu Kurihara, Takasaki, all of (JP)

(73) Assignee: Toshiba Battery Co., Ltd., Tokyo (JP)

( * ) Notice: Subject to any disclaimer, the term of this patent is extended or adjusted under 35 U.S.C. 154(b) by 0 days.

(21) Appl. No.: 09/618,287

(22) Filed: Jul. 18, 2000

(30) Foreign Application Priority Data

| Jul. 19, 1999 | (JP) | 11-205200 |
| Sep. 29, 1999 | (JP) | 11-276723 |
| Oct. 26, 1999 | (JP) | 11-304153 |
| Mar. 2, 2000 | (JP) | 2000-057327 |
| Apr. 21, 2000 | (JP) | 2000-120962 |
| May 10, 2000 | (JP) | 2000-137657 |
| May 16, 2000 | (JP) | 2000-143071 |
| May 16, 2000 | (JP) | 2000-143072 |

(51) Int. Cl.$^7$ ............................................. H01M 10/46
(52) U.S. Cl. .................................................... 320/112
(58) Field of Search ........................... 320/107, 110, 320/112; D13/103, 107, 108; 307/150; 429/96, 97, 98, 99, 100

(56) References Cited

U.S. PATENT DOCUMENTS

| 5,180,644 | 1/1993 | Bresin et al. . |
| 5,317,247 | * 5/1994 | Chong et al. . |
| 5,631,101 | 5/1997 | Amero, Jr. . |
| 5,656,876 | 8/1997 | Radley et al. . |
| 5,805,069 | * 9/1998 | Mitsui et al. . |
| 5,903,132 | * 5/1999 | Ohira et al. . |
| 5,920,178 | * 7/1999 | Robertson, Jr. et al. . |

* cited by examiner

Primary Examiner—Edward H. Tso
(74) Attorney, Agent, or Firm—Oblon, Spivak, McClelland, Maier & Neustadt, P.C.

(57) ABSTRACT

A battery pack has a flat battery cell, which includes a flat electric power generating element, at least one armor material for sealing the electric power generating element, and positive and negative tabs (1a, 2a) extending from the electric power generating element to the outside of the armor material through a sealing of the armor material; a circuit board (6) connected to the positive and negative tabs; and a container (16) having two main walls extending along two main surfaces of the flat battery cell. At least a portion of the circuit board is positioned in a space (8) defined by a sealing of the armor material beside the circuit board and the inner surface of the container. At least one of the two main walls of the container is at least partially formed of a metal plate (12a, 14a).

38 Claims, 34 Drawing Sheets

BATTERY PACK

BACKGROUND OF THE INVENTION

1. Technical Field

The present invention relates to a small size, light weight battery pack which has a flat battery contained in a container.

2. Background Art

With an ever increasing reduction in size and weight of a variety of electronic devices such as portable telephones and video cameras, a reduction in size, thickness and weight as well as improved battery characteristics including a higher energy density have been required to power supplies for driving electronic devices, such as Li ion secondary batteries.

The Li ion secondary battery is structured such that electrodes and electrolyte are encapsulated in a battery can in order to prevent the electrolyte from leaking. For meeting the requirement of a reduction in thickness, the battery can must be reduced in thickness dimension. However, it is difficult to fabricate such a thinner can by drawing process. On the other hand, for fabricating a thinner can by welding, a battery can must be seal-welded, thereby causing a lower production efficiency and a higher cost.

To solve the problem as mentioned above, film type secondary batteries (flat battery cells) have been developed by using a film of polymer solid electrolyte as electrolyte. One example of such a battery cell is illustrated in FIG. 21.

The flat battery cell illustrated in FIG. 21 includes an electric power generating element A comprised of a positive electrode; a negative electrode; and an electrolyte 3 disposed between the two electrodes. The positive electrode has an Al foil 1 of approximately 20 to 40 $\mu$m in thickness, one side of which is coated with a positive electrode mixture 1b having $LiCoO_2$ as an active material, except for a positive tab 1a. The negative electrode has a Cu foil 2 of 20 to 40 $\mu$m in thickness, one side of which is coated with a mixture 2b including a carbon material except for a negative tab 2a. Also, the electrolyte 3 is formed of a gel electrolyte including a film type polymer matrix which is swelled by a Li-ion containing electrolyte.

The electric power generating element A is wrapped by two sheets of armor materials 4, for example, Al laminate films, where peripheral portions of the armor materials 4 are thermally fused. In FIG. 22, reference numerals $4A_1$, $4A_2$, $4A_3$, $4A_4$ designate four sealings of the armor materials 4.

The illustrated flat battery cell has a thickness of approximately 2.5 to 5 mm, and the sealings $4A_1$ to $4A_4$ has a width of approximately 3 to 8 mm.

Upon sealing the armor materials 4, as both the armor materials are thermally fused and simultaneously applied with equal upward and downward pressures, a flat battery cell $B_1$ as illustrated in FIG. 23 is fabricated, with the positive and negative tabs 1a, 2a drawn out from a central position in the thickness direction of the battery cell. Alternatively, when both the armor materials are thermally fused while one of the armor materials is only applied with a pressure, a flat battery cell $B_2$ as illustrated in FIG. 24 is fabricated, with the positive and negative tabs 1a, 2a drawn from a position which is offset to the other armor material.

Since these armor materials are readily damaged, the flat battery cell is generally served in the form of a battery pack which contains the flat battery cell in a container made of a resin.

A battery pack 200 illustrated in FIG. 25 contains the flat battery cell $B_1$ or $B_2$ within a resin-made container 100 which has a divided structure consisting of an upper case 100a and a lower case 100b. For fabricating the battery pack 200, the flat battery cell is disposed in the lower case 100b with the sealings $4A_1$, $4A_2$, $4A_3$ bent upward or downward, and a circuit board 6 mounted with parts of a protection circuit for monitoring a battery voltage and a battery temperature and for controlling charging and discharging currents is accommodated in the lower case 100b. Then, terminals 6a of the circuit board 6 are electrically connected to the positive and negative tabs 1a, 2a of the flat battery cell drawn from the sealing $4A_4$. Next, the upper case 100a is mated with the lower case 100. In FIG. 25, reference numeral 6b designates a molding which molds circuit parts with a resin, and 6c designates a lead set which includes a positive electrode lead, a negative electrode lead and a temperature sensor lead.

As previously described, battery packs are required to have a higher capacity, a smaller size and a lighter weight. Thus, the battery packs are simultaneously required to have flat battery cells of higher capacity and to be reduced in thickness and two-dimensional size of the battery pack.

The thickness of a battery pack is defined by the overall thicknesses of a flat battery cell, a circuit board and a container. Since the thickness of the flat battery cell is increased as it has a larger capacity, the container must be reduced in wall thickness for simultaneously achieving a higher capacity and a smaller thickness of the battery pack. However, a conventional resin-made container has a limitation to a reduction in wall thickness of the container from a viewpoint of ensuring a sufficient strength of the container. For example, it is difficult to reduce the wall thickness of the upper and lower cases, which form the container, to approximately 0.4 mm or less.

The two-dimensional size of the battery pack is mainly defined by the two-dimensional shape of an electric power generating element of the flat battery cell, the two-dimensional shape of the circuit board, and the two-dimensional area of a connection region 7' between the positive and negative tabs and the circuit board. Here, the two-dimensional sizes of the electric power generating element and the circuit board are defined basically by requirements to the characteristics of the battery cell, so that it is difficult to reduce the two-dimensional sizes of the electric power generating element and the circuit board from a viewpoint of simultaneously achieving a higher capacity and a smaller size of the battery pack.

Generally, parts of a protection circuit mounted on a circuit board of a battery pack provide an excessive charging protection function which controls a charging current to prevent the battery from being excessively charged, and an excessive discharging protection function for preventing a polarity change due to excessive discharging, an increased internal pressure, deteriorated performance, and so on. In addition, some protection circuits also provide an excessive current protection function for protecting the battery from an excessive current which may be generated when the battery is externally short-circuited.

Recent improvements in the performance of flat battery cells result in less requirements to the excessive charging protection function, and the excessive discharging protection function can be eliminated by reducing a leak current of a battery. On the other hand, however, the excessive current protection function is still needed since external short-circuiting can occur irrespective of the performance of a particular battery, and therefore a current fuse has been conventionally used for protecting the battery from an excessive current.

The current fuse, however, is designed to protect a battery from an excessive current as it is fused by resistive heat which is generated when the excessive current is generated, so that the current fuse involves a problem that it loses the excessive current protection function after it is fused.

For connecting a flat battery cell and a circuit board, positive and negative tabs of the flat battery cell are generally laid on the top of a positive electrode land and a negative electrode land on the protection circuit board, and are connected to each other by spot welding or ultrasonic welding. Generally, the lands on the circuit board are formed of Cu, whereas the positive tab of the flat battery cell is made of Al and the negative tab is made of Ni.

In this way, the positive electrode land and the positive tab are made of different types of materials from each other, and likewise the negative electrode land and the negative tab are also made of different materials from each other. For this reason, the strength of the connection between the lands and tabs are not so high, causing the connection structure to be susceptible to failure when the battery pack is applied with an impact, and possibly the loss of the battery function.

As previously described, a flat pack may be equipped in a portable telephone, and may be removably mounted, for example, into the back of a telephone body. Generally, a flat battery cell has a plurality of, for example, three flat terminals which are exposed on the surface of a container, in which the flat battery cell is contained, through holes formed therethrough. As the battery pack is mounted into the telephone body, these flat terminals are brought into face contact with three corresponding flat terminals which are exposed on a surface of the telephone body on which the battery pack is mounted, thereby resulting in electrical connection of the flat battery cell to a power supply circuit of the portable telephone. For a personal digital assistant (PDA), likewise, a plurality of, for example, six flat terminals of a battery pack are brought into face contact with six corresponding flat terminals of the PDA.

As described above, while the wall thickness of the container is reduced to meet the requirements of a higher capacity and a reduced thickness to the flat battery cell, the flat battery cell is more susceptible to flexure and/or deformation as the wall thickness of the container is smaller, when an electronic device is applied with an external force by some reason. This is particularly true in the structure in which electric connection is established between a battery and an electronic device such as a portable telephone, PDA or the like through flat terminals of both sides which are brought into face contact with each other. The flexure and/or deformation, if any, causes the breaking of a normal face contact state between the flat terminals on the battery side and the flat terminals on the telephone body side, thus resulting in a failed contact between both sides.

In addition, since the flat terminals are exposed, inadvertent storage of the battery pack into a bag or the like, by way of example, may cause the flat terminals to contact any metal article and consequently result in external short-circuiting. Furthermore, the surfaces of the flat terminals may be contaminated by sweat or the like to deteriorate a conduction with the corresponding terminals when the battery pack is mounted into the telephone body.

SUMMARY OF THE INVENTION

It is an object of the present invention to provide a battery pack comprising a container which is reduced in wall thickness while ensuring a required strength thereof.

It is another object of the present invention to provide a battery pack which can be reduced in size, particularly, in the two-dimensional size, by making use of a dead space within a container.

It is a further object of the present invention to provide a battery pack which is capable of providing a firm engagement between a connection of an electronic device and a connection of the battery pack mounted thereto, so that a failed electric connection is avoided even when an external force is applied to cause deformation of the electronic device and/or the battery pack.

It is a further object of the present invention to provide a battery pack which can be further reduced in thickness by reducing the height dimension of sealings of an armor material, which are bent in the height direction of a battery cell, on the circuit board side.

It is a further object of the present invention to provide a battery pack which is reduced in the two-dimensional size by electrically connecting positive and negative tabs of a flat battery cell directly to connection terminals of a circuit board.

It is a further object of the present invention to provide a battery pack which simplifies a feature involved in electric connection between the battery pack and an electronic device, to which the battery pack is mounted, and has a reduced dimension in the height direction of the battery pack in this electric connection feature.

It is a further object of the present invention to provide a battery pack which increases the strength of connection between positive and negative tabs of a flat battery cell and lands of a circuit board.

It is a further object of the present invention to provide a battery pack which has an excellent excessive current protection function for protecting a battery cell from an excessive current due to external short-circuiting.

According to the present invention, there is provided a battery pack which comprises a flat battery cell including a flat electric power generating element, at least one armor material for sealing the flat electric power generating element, and a positive tab and a negative tab extending from the electric power generating element to the outside of the armor material through sealings of the armor material; a circuit board connected to the positive tab and the negative tab; and a container having two main walls extending along two main surfaces of the flat battery cell. At least a portion of the circuit board is positioned in a space defined by the sealing of the armor material beside the circuit board and an inner surface of the container. At least one of the two main walls of the container is at least partially formed of a metal plate. Preferably, the flat electric power generating element is comprised of a sheet-shaped electric power generating element.

According to the present invention, since at least a portion of at least one of the two main walls of the container is made of a metal plate, at least the portion of the main walls of the container can be reduced in thickness while maintaining a required strength of the overall container, as compared with a container entirely made of resin, thereby making it possible to reduce the thickness dimension of the container. Also, since a portion or the entirety of the circuit board is accommodated in the space defined by the sealing of the flat battery cell beside the circuit board and the container, an internal space of the container is effectively utilized to reduce the length of the container in the longitudinal direction and accordingly reduce the amount of used component members, thereby making it possible to reduce the weight of the container. In addition, the synergistic effects produced by the use of the metal plate and the effective utilization of the internal space of the container allows for a reduction in the size, particularly, the two-dimensional size of the battery pack, and also for a reduction in the thickness of the overall battery pack. Further, the thickness dimension of the internal space can be increased by the reduction in wall thickness of the container, so that a thicker flat battery cell can be contained in the container to increase the capacity of the battery cell without increasing the thickness of the entire battery pack.

In the present invention, preferably, the container comprises two case halves, and at least one of the case halves includes a metal plate constituting the main wall, and a frame made of resin, and attached to the metal plate.

According to this preferred battery pack, the battery pack can be readily and rapidly assembled using a two-divided container.

Preferably, the metal plate is insert molded into the frame made of resin. Alternatively, the metal plate has a side wall fitted into the frame made of resin. More preferably, the side wall of the metal plate is formed with stoppers, and the frame is formed with recesses into which the side wall can be inserted, wherein the stoppers are extendable in the recesses of the frame to prevent the metal plate from coming off from the frame.

According to the foregoing preferred battery pack, the container can be simplified in structure, and reduced in wall thickness because of an increased strength of the container.

Preferably, one of the case halves is made of resin, and a metal label is adhered on the surface thereof.

According to this preferred battery pack, the strength of the container is increased, so that the container can be reduced in wall thickness.

Preferably, the frame is made of a resin composition composed of a thermoplastic resin and a glass component. More preferably, the thermoplastic resin is polycarbonate or liquid crystal polymer or a compound of polycarbonate and acrylic butadiene styrene resin, and the glass component is chopped glass fiber or glass beads. A percentage of the glass component is preferably in a range of 10 to 25 volume %.

According to this preferred battery pack, the frame having required mechanical characteristics, for example, a required strength and flexibility, can be reliably provided without producing failed moldings.

Preferably, the frame forms an insulating region extending over an inner surface of the metal plate constituting the main wall of the one case half.

According to this preferred battery pack, the metal plate can be electrically insulated from the circuit board by the insulating region, thereby making it possible to obviate electrical failures.

Preferably, either one of the two case halves is provided with connection terminals for connection of the circuit board to an electronic device, exposed on an outer surface of the case half. For example, the case half is provided with openings through which the connection terminals used for connection of the circuit board to the electronic device are exposed on the outer surface of the frame.

According to this preferred battery pack, the circuit board of the battery pack can be electrically connected readily to an external device.

Preferably, the connections of the positive and negative tabs to the terminals of the circuit board are positioned within the space.

According to this preferred battery pack, since the internal space within the container is effectively utilized to make the connection of the positive and negative tabs to the circuit board, the container and hence the battery pack can be reduced in size.

Preferably, a pair of lands are formed on the circuit board, wherein the pair of lands are connected directly with the positive and negative tabs.

According to this preferred battery pack, the space required for connecting the circuit board to the positive and negative tabs can be reduced, so that the internal space of the container can be effectively utilized, and consequently a reduction in size of the container and hence the battery pack can be realized.

More preferably, the circuit board is mounted with protection circuit parts, wherein the positive tab is made of Al, and the negative tab is made of Ni. The positive tab and the negative tab are welded to the pair of lands on the circuit board. The pair of lands are comprised of a positive land to which a Ni surface of an Al/Ni clad piece is soldered and a negative land to which a Ni piece is soldered. More preferably, the soldering is performed simultaneously with reflow processing upon surface mounting the protection circuit parts on the circuit board.

According to this preferred battery pack, the clad piece and the Ni piece are soldered to the lands of the circuit board, so that a high bonding strength is provided. In addition, since the positive and negative tabs are, for example, spot soldered to the lands made of the same kind of material, a high soldering strength is ensured, so that the resulting battery pack is less susceptible to damages even if it is applied with an impact.

In the present invention, preferably, the metal plate of the case half is formed with a plurality of ribs or openings.

According to this preferred battery pack, since the metal plate exhibits a higher strength, the wall thickness of the metal plate can be reduced, thereby accomplishing a reduction in weight of the container. When the opening is formed, a light-weight container can be provided.

Preferably, the case half forms part of an outer wall of an electronic device to which the battery pack is mounted.

According to this preferred battery pack, the main wall of the case half of the battery pack disposed beside the outer wall of the electronic device can be formed of resin in a desired shape to form part of the outer wall of the electronic device, thus contributing to a reduction in size and weight of the electronic device.

Preferably, the battery pack is arranged to be mounted to an electronic device having a terminal set, and the battery pack includes a terminal set mounted on the container opposite to the terminal set of the electronic device, and connectable to the terminal set of the electronic device. The terminal set of the battery pack includes a resin molding mounted to the container, and terminals exposed in the resin molding and connected to the circuit board, wherein the terminal set is firmly engaged with the terminal set of the electronic device when the battery pack is mounted to the electronic device.

According to this preferred battery pack, when the battery pack is mounted to the electronic device, the terminal set of the battery pack is firmly engaged with the terminal set of the electronic device to be integrated therewith. Thus, even if an external force is applied to the battery pack and/or the electronic device to result in deformation such as deflection, no contact failure will occur between both the terminal sets, thus presenting a high reliability. Since the terminals in the terminal set of the battery pack are positioned in hollow spaces in the resin molding, and are not exposed to the outside of the resin molding, external short-circuiting due to a contact with a metal article is less likely, and contamination due to sweat or the like is infrequent.

Preferably, the electronic device is a portable telephone or a PDA (personal digital assistant).

According to this preferred battery pack, it is possible to avoid failed electric connection of the battery pack to a portable telephone or PDA, so that individual users need not pay excessive attention to the portable telephone or PDA when they handle it, thus facilitating the handling of the portable telephone and PDA.

In the present invention, preferably, an armor material for sealing the electric power generating element of the flat battery cell is sealed along first and second peripheral sides respectively extending along two side edges of the electric power generating element, and along a third peripheral side extending along an end edge of the electric power generating element beside the circuit board. The first and second peripheral sides of the armor material are bent along the side edges of the electric power generating element in a thickness direction of the flat battery cell. Also, the width dimension of a portion of the first and second peripheral sides beside the circuit board is smaller than the width dimension of the remaining portion of the first and second peripheral sides, such that a height dimension of the portion of the two peripheral sides beside the circuit board is smaller when the first and second peripheral sides are bent.

The foregoing preferred battery pack and its preferred embodiment are intended to solve a problem in a pack structure C in FIG. 26 which has been devised prior to the creation of the present invention by the present inventors.

The battery pack described with reference to FIGS. 21 to 25 is such that the electric power generating element is wrapped with two armor materials. Alternatively, as illustrated in FIG. 26, it is contemplated that the electric power generating element is wrapped with a single armor material folded in two. In this case, the two-folded armor material is thermally fused along three peripheral sides extending external to the electric power generating element, thereby accomplishing a flat battery cell.

In the battery pack C in FIG. 26, peripheral sides $4A_1$, $4A_3$ of the armor material are bent upwardly along the side surface of the battery cell. The width dimension of the peripheral sides $4A_1$, $4A_3$ is the same over the entire peripheral side. As these peripheral sides are bent, portions $4a_1$, $4a_3$ of the two peripheral sides beside the circuit board extend over the width dimension of the two peripheral sides in the thickness direction of the battery cell outside the end surface of the battery cell to form screens.

Then, the positive and negative tabs $1a$, $2a$ are connected to the circuit board 6, and a portion or the entirety of the circuit board 6 is positioned within a space 8 defined by the screens $4a_1$, $4a_3$, the peripheral side $4A_4$ and the container. The circuit board 6 is mounted with circuit parts for monitoring the temperature on the battery cell and controlling charged and discharged currents to protect the flat battery cell B. These circuit parts are molded by a resin material. The circuit board 6 is formed with, for example, a positive lead, a negative lead, and a temperature sensor lead on its bottom surface, while the lower case $5a$ is formed with three windows $5c$ such that the three leads of the circuit board 6 are exposed to the outside through the windows.

With the battery pack C in FIG. 26, two tab leads $6d$, $6e$ arranged on the top surface of the circuit board 6 are, for example, ultrasonic welded to the positive and negative tabs $1a$, $2a$, respectively, as illustrated in FIG. 27. Then, as indicated by imaginary lines in FIG. 27, the overall connected assembly comprised of the tab leads and the positive and negative tabs are bend upwardly and accommodated in a space above the circuit board 6.

The foregoing battery pack C involves the following problems.

First, the screens $4a_1$, $4a_3$ formed by bending the peripheral sides $4A_1$, $4A_3$ of the armor material extend in the height direction of the battery cell, so that the height dimension of the container must be large enough to accommodate the screens $4a_1$, $4a_3$ of the flat battery cell. In addition, for placing the two lead pieces, fabricated by welding the positive and negative tabs of the flat battery cell B to the tab leads of the circuit board 6, above the circuit board 6, a relatively large space must be ensured for accommodating the lead pieces in order to prevent the lead pieces from breaking. From this point of view, the container must have a large height dimension. Moreover, the lead pieces must undergo an insulating treatment in order to prevent the two lead pieces from short-circuiting with parts mounted on the circuit board.

The battery pack according to a preferred embodiment of the present invention has a much smaller width dimension of the portions (corresponding to the elements $4a_1$, $4a_3$ in FIG. 26) of the first and second peripheral sides (corresponding to the elements $4A_1$, $4A_3$ in FIG. 26) of the armor material beside the circuit board than the width dimension of the remaining portions of the two peripheral sides to significantly reduce the height dimension of the portions of the first and second peripheral sides beside the circuit board, when they are bent upwardly, thereby making it possible to remove the screen in the battery pack C of FIG. 26 and accordingly reduce the thickness of the overall container.

In the present invention, preferably, the circuit board is flexible, and includes an extension extending outwardly from the container, wherein the extension serves as external connection terminals for use in electric connection of the battery pack to an electronic device to which the battery pack is mounted.

The foregoing preferred battery pack and its preferred embodiment is intended to solve a problem in a battery pack in FIGS. 28 to 31 which has been devised prior to the creation of the present invention by the present inventors.

When a protection circuit is incorporated into the battery pack, electronic parts 61 constituting the protection circuit are mounted on the printed circuit board 6 as illustrated in FIG. 28, and tabs $6d$, $6e$ provided on the printed circuit board 6 are welded to positive and negative tabs $1a$, $2a$ of the flat battery cell to electrically connect the protection circuit to the flat battery cell. In addition, a plurality of external connection terminals (pads) $6h'$ on a terminal plate $6g'$ mounted on the circuit board 6 are exposed through openings $5c$ formed through the bottom wall of the container 5 such that they can be connected to the outside, as illustrated in FIG. 29.

Electrode terminals of an electronic device can be implemented by a connector 106 having pin-type contact terminals $106a$ which are urged in the axial direction and arranged for advancing and retracting movements as illustrated in FIG. 30, or by a connector 107 having plate spring type contact terminals $107a$ as illustrated in FIG. 31. The electrode terminals are mounted on a printed circuit board 108 of the electronic device such that they overlie the battery pack. Then, as the battery pack is inserted into a battery pack bay 109 of the electronic device, the contact terminals $106a$, $107a$ are brought into contact with the external connection terminals $105a$ of the battery pack through the openings $5c$ of the battery pack.

In the battery pack configured as described above, the external connection terminals $105a$ are brought into pressure contact with the contact terminals 106a, 107a of the connectors 106, 107, so that a terminal plate 6g' must be made rigid enough to resist resilient forces of the contact terminals 106a, 107a. In addition, an electronic device such as a portable telephone has limits in reducing its thickness because the battery pack and the connectors 106, 107 are placed one above the other, even though a region in which the battery pack is mounted, including connections with the connectors 106, 107, can be reduced.

According to the battery pack in a preferred embodiment of the present invention, the extension of the flexible circuit board is extended external to the container such that the extension functions as external connection terminals for use in electrical connection of the battery pack to an electronic device, thereby making it possible to eliminate incorporation of terminal plates into the battery pack to simplify the configuration of the battery pack, provide a strong structure against bending and so on, and readily establish the electric connection of the battery pack to the electronic device. In addition, since the connector for making the electric connection of the battery pack to the electronic device need not be arranged to overlie the battery pack in the electronic device, the electronic device can be reduced in thickness.

Preferably, circuit parts constituting a protection circuit for the flat battery cell are mounted on the circuit board, and the circuit board includes tabs connected to the positive and negative tabs of the flat battery cell.

According to this preferred battery pack, the flat battery cell is protected by the protection circuit mounted on the circuit board. In addition, the area of a connection region for the circuit board and the positive and negative tabs can be reduced.

Preferably, the container is formed in the shape of flat box, and the extension of the circuit board extends from the container in parallel with the main wall of the container. More preferably, the extension of the circuit board is sandwiched by a connector of an electronic device to which the battery pack is mounted.

According to the foregoing preferred embodiment, the connector for use in connecting the battery pack to an electronic device can be positioned in a side region of the battery pack, thus contributing to a reduction in thickness of the electronic device.

In the present invention, preferably, the battery pack includes a resistive element having a positive temperature coefficient (PTC) and arranged on the sealing of the armor material, disposed on the circuit-board side, through a thermally insulating material. The resistive element has one end portion thereof connected to one of the positive tab and the negative tab. More preferably, the resistive element includes a pair of metal foils, and an electrically conductive polymer sheet interposed between the metal foils and having a positive temperature coefficient, wherein the resistive element is formed in L-shape as seen in a plan view.

According to this preferred battery pack, since the thin resistive element having the PTC characteristic is arranged for a peripheral sealing of the armor material beside the positive and negative tabs, a permanent excessive current protection function can be provided without sacrificing a reduction in wall thickness of the battery pack.

In the present invention, the foregoing features of the respective preferred embodiments can be combined in various ways.

DESCRIPTION OF THE PREFERRED EMBODIMENTS

A battery pack according to a first embodiment of the present invention will hereinafter be described with reference to the accompanying drawings.

Figure 1:
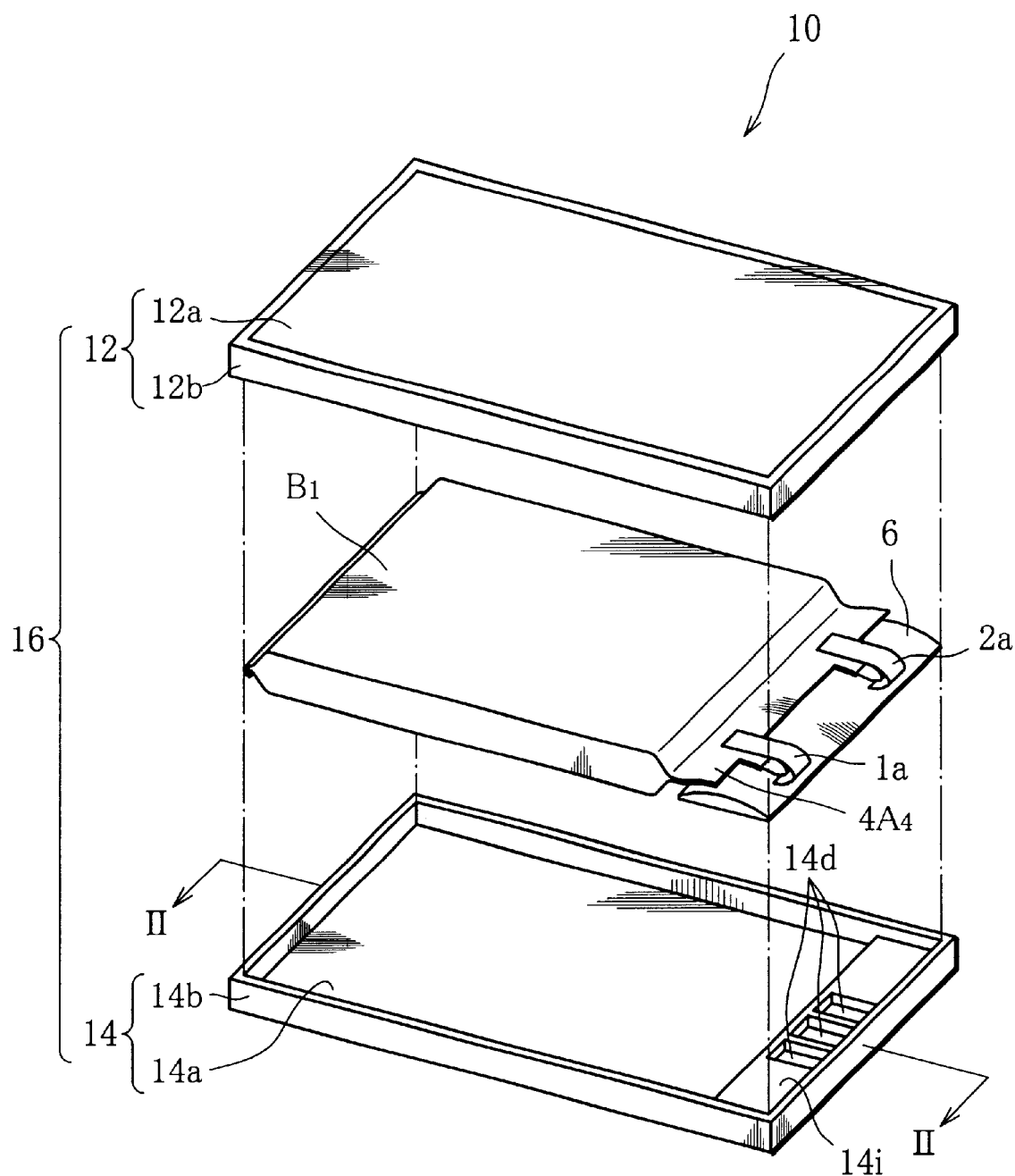
FIG. 1 is a perspective view illustrating a battery pack according to a first embodiment of the present invention.

In FIG. 1, the illustrated battery pack 10 has a flat battery cell $B_1$; a circuit board 6 adapted to be connected to a positive tab 1a and a negative tab 2a of the flat battery cell $B_1$; and a container 16 having a divided structure consisting of an upper case 12 and a lower case 14. The flat battery cell and the circuit board are contained in the container. Here, a portion of the circuit board 6 is positioned in a space defined by a sealing $4A_4$ on one side of the flat battery cell and the inner surface of the lower case 14.

The upper case 12 of the container 16 comprises a metal plate (having a thickness of 0.2 mm) 12a made of aluminum, and a frame (having a thickness of 0.8 mm and a height of approximately 2.1 mm) 12b made of a resin, which is integrated with the metal plate 12a. The lower case 14 in turn comprises a metal plate 14a, and a frame 14b integrated with the metal plate 14a. The upper case 12 and the lower case 14 are mated to form the container 16 which is formed in the shape of thin box, as a whole, that has a long side of 65 mm, a short side of 37 mm, and a thickness of 4.2 mm. The flat battery cell $B_1$ or $B_2$, contained in the container 16, has, for example, a long side of 65 mm (note that this dimension includes the length of sealings of an armor film), a short side of 35 mm, and a thickness of 3.6 mm.

The metal plate 12a of the upper case 12 and the metal plate 14a of the lower case 14 are formed in rectangle, and constitute a top wall and a bottom wall of the container 16, respectively. Stated another way, the upper case 12 and the lower case 14 define a first case half of the container and a second case half attached thereto, respectively, while their metal plates 12a, 14a constitute two main walls of the container which respectively extend along two main plane of the flat battery cell. It should be noted that in modified examples of this embodiment, second through fifteenth embodiments and modified examples thereof, later described, the upper case may correspond to the second case half and the lower case may correspond to the first case half.

The frames 12b, 14b of the upper case 12 and the lower case 14 have their opposing surfaces mated to form side walls of the container 16 to maintain the spacing between the metal plates 12a, 14a constant. Then, in the lower case 14, the frame 14b extends beyond the inner surface of the metal plate 14a to form an insulating region 14i which covers a portion of the metal plate 14a. This insulating region 14i prevents electric conduction from the bottom of the circuit board 6 to the metal plate 14a. Further, the insulating region 14i is formed with three windows 14d arranged in parallel in the short side direction of the lower case 14 such that leads protrusively formed on the bottom of the circuit board 6 are exposed through these windows.

Figure 2:
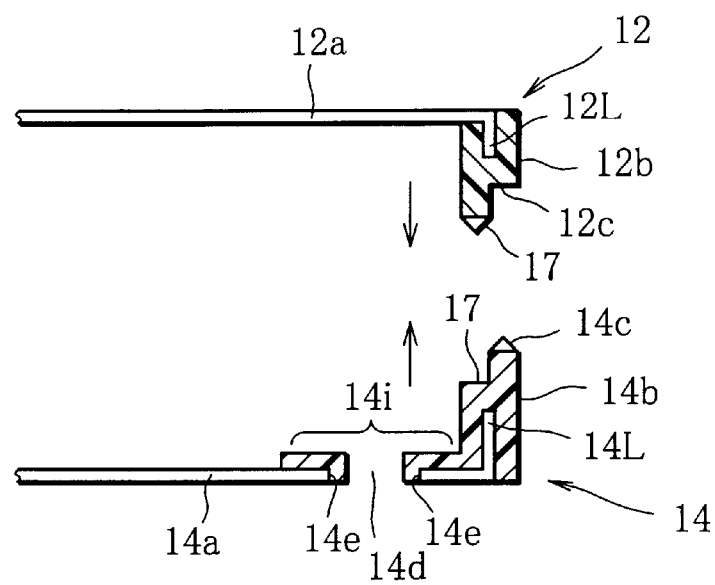
FIG. 2 is a partial enlarged cross-sectional view taken along the line II—II in FIG. 1.

As illustrated in FIG. 2, the metal plates 12a, 14a are formed with side walls 12L, 14L, respectively, which extend orthogonal to their main planes, and the frames 12b, 14b are formed integral with the side walls 12L, 14L in such a manner that the frames 12b, 14b surround the side walls. The metal plates 12a, 14a are insert molded into the frames 12b, 14b, respectively, so that consequently, the side walls 12L, 14L are molded into the frames 12b, 14b. Here, the insert molding means that a resin is poured into a mold having an object (metal plate) placed therein to embed the metal plate in the resin molding for integration of the two. In addition, the insulating region 14i and the windows 14d are also formed integrally during the insert mold step. It should be noted that for forming the windows 14d, the metal plate 14a has been previously formed with holes larger than the windows 14d, and peripheral surfaces 14e of the holes are molded by a resin. In this way, leads of the circuit board 6 inserted into the respective windows 14d are prevented from electrical connection with the metal plate 14a.

Then, the respective opposing surfaces of the frames 12b, 14b are bonded to mate the upper case 12 with the lower case 14. Here, the upper frame 12b is formed with a step 12c on a fitting surface thereof, while the lower frame 14b is formed with a step 14c on a fitting surface thereof, such that the protrusion of the step 12c is inserted into the recess of the step 14c, while the recess of the step 12c is fitted into the protrusion of the step 14c. Subsequently, the fitting surfaces of the recesses and the protrusions are welded, for example, by ultrasonic waves to mate the upper case 12 with the lower case 14. For facilitating the welding process, the protrusions of the steps 12c, 14c are formed with welding ribs 17, respectively, which extend from the tops of the protrusions. Alternatively, the welding rib 17 may be formed on either one of the steps 12c, 14c.

Figure 3:
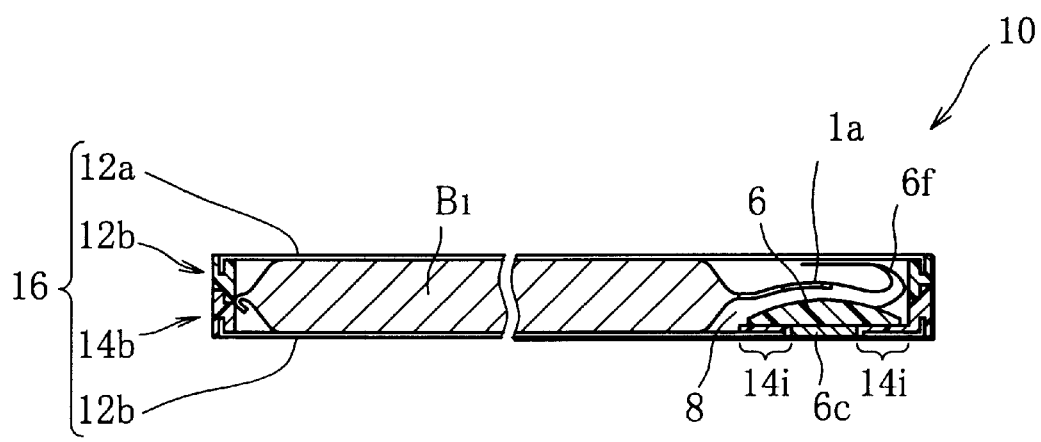
FIG. 3 is a cross-sectional view illustrating a container in FIG. 1 together with a flat battery cell and circuit board contained therein.

As described above, the battery pack 10 is completed with the flat battery cell $B_1$ and the circuit board 6 contained therein. In this structure, as illustrated in FIG. 3, the respective metal plates 12a, 14a are arranged in parallel with and in substantially close contact with the flat surfaces of the flat battery cell $B_1$. In addition, since the metal plates 12a, 14a, even with a small thickness, has a proper strength, the battery pack can ensure an appropriate strength characteristic and simultaneously reduce the overall thickness thereof as compared with a container which is entirely formed of thick resin. Also, while the upper case 12 and the lower case 14 are mated with each other by way of the frames 12b, 14b, the frames are made of resin so that the steps for positioning and so on can be readily formed on the fitting surfaces of the frames 12b, 14b, thereby making it possible to facilitate the mating of the upper case 12 with the lower case 14.

In this embodiment, the flat battery cell $B_1$ is fixed to the lower case 14, for example, with an adhesive tape, and the circuit board 6 is arranged on the insulating region 14i of the lower case 14 such that three leads 6c (a positive lead, a negative lead, and a temperature measuring sensor lead) formed protrusively on the bottom of the circuit board are exposed on the bottom of the lower case 14 through the respective windows 14d.

Figure 4:
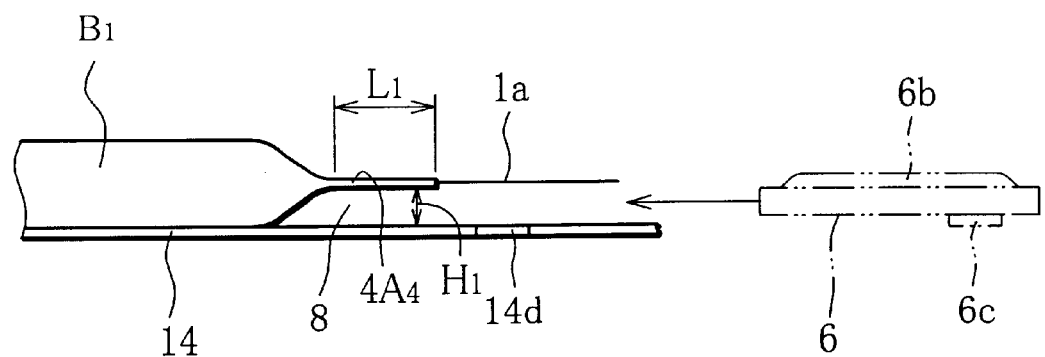
FIG. 4 is a partial side view for explaining how the circuit board is disposed in a space between a lower case of a container and a sealing of a flat battery cell $B_1$.

When the flat battery cell $B_1$ is placed on the lower case 14 as described above, a space 8 is formed between the lower case 14 and the sealing $4A_4$, as illustrated in FIG. 4. This space 8, which is formed in a direction in which the sealing $4A_4$ extends (the direction perpendicular to the plane of the drawing), has a height ($H_1$) approximately one half of the thickness of the flat battery cell $B_1$, and a length ($L_1$) equal to the width of the sealing $4A_4$.

Figure 5:
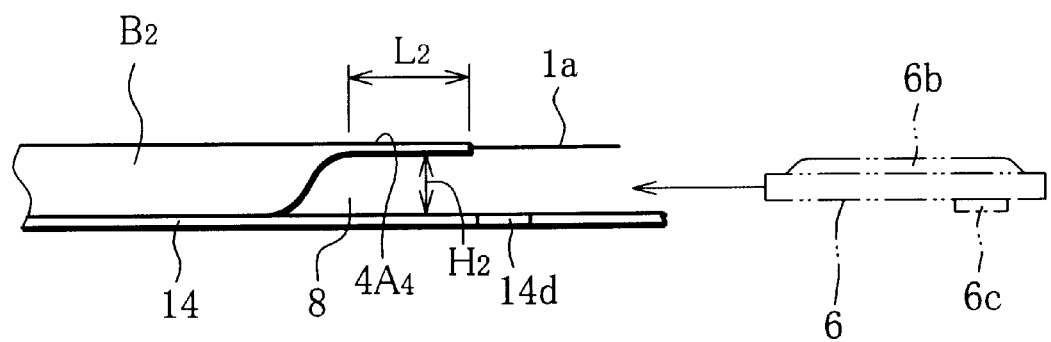
FIG. 5 is a partial side view for explaining how the circuit board is disposed in a space between a lower case of a container and a sealing of a flat battery cell $B_2$.

Similarly, when a flat battery cell $B_2$ is placed on the lower case 14, a similar space 8 is formed as illustrated in FIG. 5. The space 8 has a height ($H_2$) substantially equal to the thickness of the flat battery cell $B_2$, and a length ($L_2$) equal to the width of the sealing $4A_4$.

Then, in the battery pack 10, the foregoing space 8 accommodates the circuit board 6 which has an overall thickness smaller than the height ($H_1$, $H_2$) of the space 8. It should be noted that in the case of FIG. 4 in which the circuit board 6 is inserted into a narrower space, even if the thickness of the circuit board 6 is larger than the height ($H_1$) of the space 8, the sealing $4A_4$ may be deflected upward to increase the height ($H_1$) of the space 8, so that the circuit board 6 can be accommodated.

Figure 25:
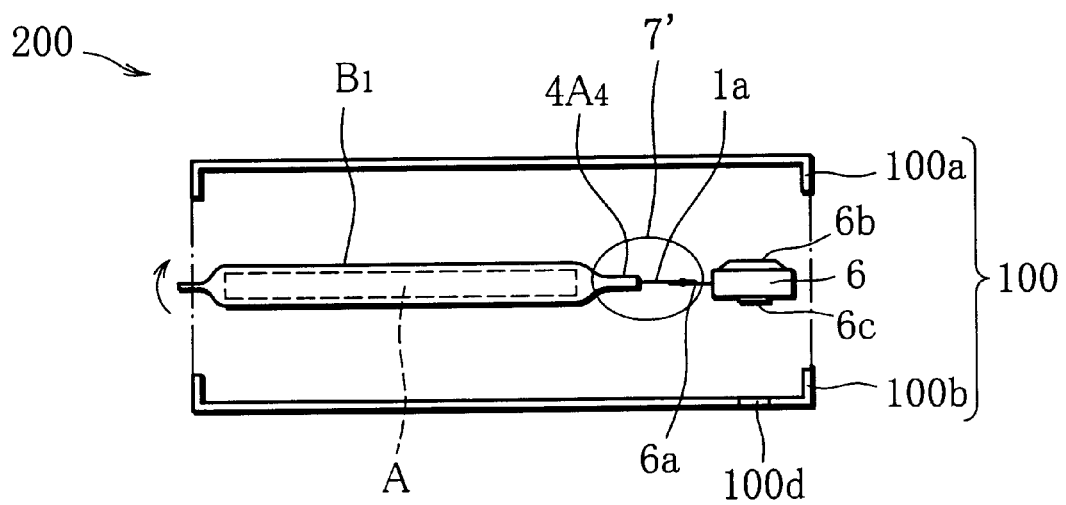
FIG. 25 is an exploded side view illustrating an example of a prior art battery pack.

Therefore, such arrangement of the circuit board, if employed, results in a reduction in the spacing in the horizontal direction between the flat battery cell and the circuit board approximately by the width of the sealing $4A_4$ ($L_1$, $L_2$), as compared with the positional relationship between the flat battery cell and the circuit board previously illustrated in FIG. 25, and consequently a reduction in the longitudinal dimension of the battery pack 10.

Figure 6:
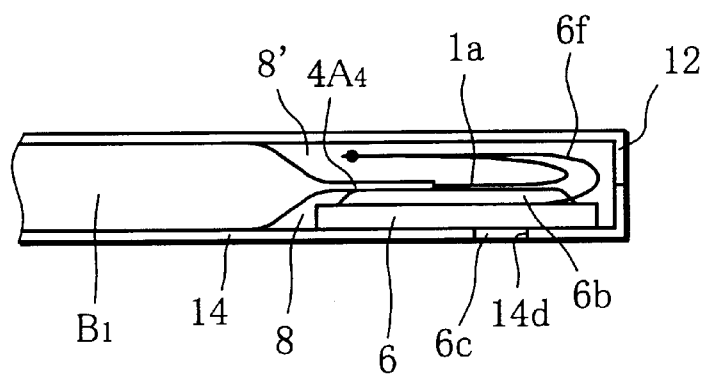
FIG. 6 is a side view illustrating a structure for connecting the flat battery cell to the circuit board in the battery pack of FIG. 1.

In this embodiment, a structure for connecting the circuit board 6 partially or entirely accommodated in the space 8 to the positive and negative tabs 1a, 2a of the flat battery cell $B_1$ or $B_2$ is designed as illustrated in FIG. 6.

Specifically, in FIG. 6, the flat battery cell $B_1$ or $B_2$ ($B_1$ in FIG. 6) is arranged in the lower case 14, and the circuit board 6 is partially accommodated in the space 8 below the sealing $4A_4$. Then, the leads 6c of the circuit board 6 are exposed through the windows 14d of the lower case 14. The circuit board 6 is provided with circuit terminals from which two lead pieces 6f are drawn.

Electric connection of the flat battery cell $B_1$ to the circuit board 6 is established by bending the positive and negative tabs 1a, 2a (only the positive tab 1a is illustrated in FIG. 6) toward a space 8' formed by the sealing $4A_4$ and the upper case 12, likewise bending the lead pieces 6f of the circuit board 6 toward the space 8', and welding the tabs and the lead pieces, as illustrated in FIG. 6.

According to this connection structure, the space formed by the flat battery $B_1$, circuit board 6 and upper case 12 is not a dead space but is converted to an effective space in which the positive and negative tabs 1a, 2a and the lead pieces 6f are positioned, so that the space can be saved in a region near the connection structure, thereby contributing to the realization of a smaller size and a reduced thickness of the battery pack 10, in combination with the employment of the aforementioned container 16.

Next, a battery pack according to a second embodiment of the present invention will be described below.

Figure 7:
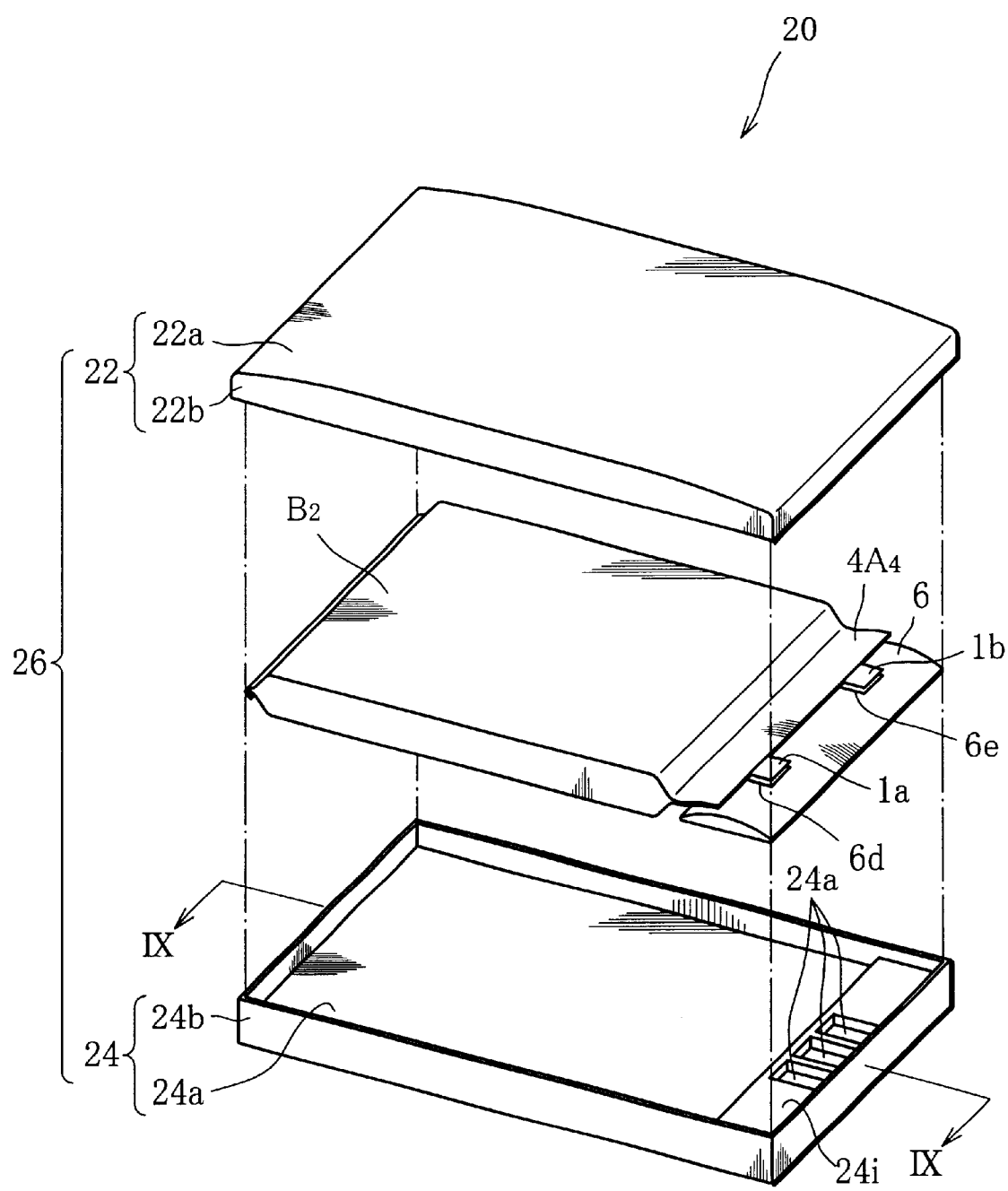
FIG. 7 is a perspective view illustrating a battery pack according to a second embodiment of the present invention.

Referring to FIG. 7. a battery pack 20 comprises a separately structured container 26 composed of an upper case 22 (having a thickness of 0.4 mm and a height of 0.6 mm) made of resin and a lower case 24 which are mated with each other to form the container 26. The battery pack 20 also comprises a flat battery $B_2$ and a circuit board 6 contained in the container 26.

Figure 8:
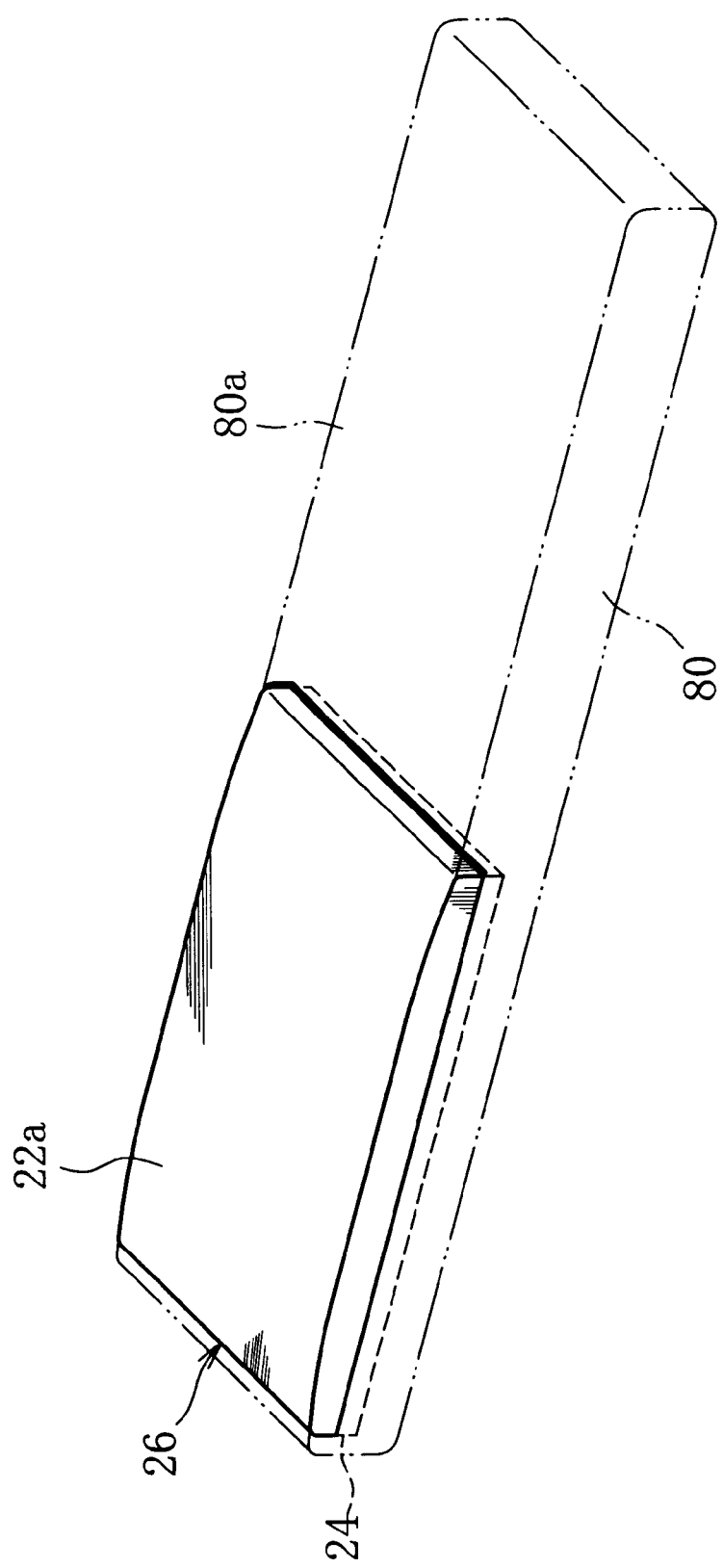
FIG. 8 is a perspective view illustrating a state in which the battery pack of FIG. 7 is mounted in a portable telephone.

The upper case 22 is formed substantially in the shape of thin box, as a whole, that has a long side of 67 mm, a short side of 37 mm, and a thickness of 0.6 mm. An outer wall 22a of the upper case 22 is protrusively curved slightly toward the outside, and a side wall 22b is formed on the periphery of the outer wall 22a, extending orthogonal to the outer wall. More specifically, as illustrated in FIG. 8, when the battery pack 20 is mounted in an electronic device (for example, a portable telephone) 80, the outer wall 22a forms part of an outer wall 80a of the electronic device. The lower case 24 has the same structure as the lower case 14 of the previously described container 10, so that its description is omitted.

Figure 9:
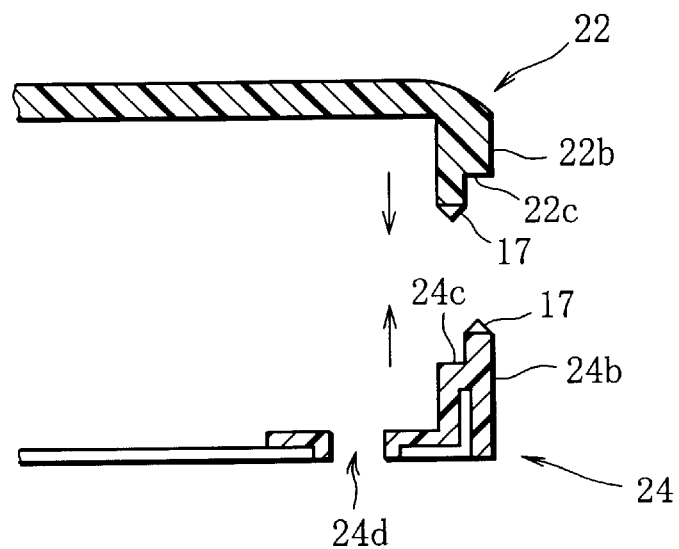
FIG. 9 is a cross-sectional view taken along the line IX—IX in FIG. 7.

Then, a frame 24b of the lower case 24 and the side wall 22b of the upper case 22 have their opposing surfaces mated with each other to constitute the side wall of the container 26 and to maintain the spacing between the metal plate 24a and the upper case 22 constant. In this structure, as illustrated in FIG. 9, the side wall 22b is formed on a fitting surface thereof with a step 22c which is fitted into a step 24c formed on a fitting surface of the frame 24b. Then, the two components are welded to join the upper case 22 and the lower case 24 in a manner similar to the container 10 illustrated in FIG. 1. The step 22c is formed with a welding rib 17 which extends from a protrusion thereof.

Figure 10:
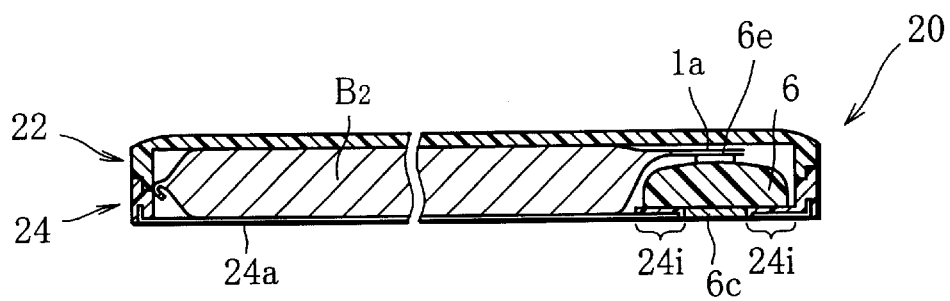
FIG. 10 is a cross sectional view illustrating a container in FIG. 7 together with a flat battery cell and circuit board contained therein.

Thus, the battery pack 20 is completed with the flat battery cell $B_2$ and the circuit board 6 contained therein, as illustrated in FIG. 10. In this structure, the metal plate 24a of the lower case 24 is arranged in parallel with and in substantially close contact with the flat surfaces of the flat battery cell $B_2$. Then, assuming that the overall thickness of the battery pack is constant, the metal plate 24a, even with a small thickness, has a proper strength, so that the battery pack can ensure an appropriate strength characteristic and simultaneously increase the thickness of the flat battery cell contained therein to provide a higher capacity, as compared with a container which is entirely formed of thick resin.

Figure 11:
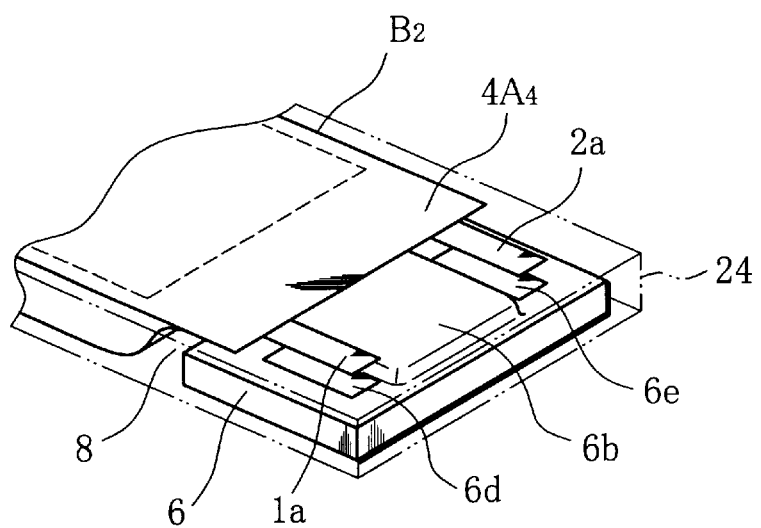
FIG. 11 is a partial perspective view illustrating a structure for connecting a flat battery cell to a circuit board in the battery pack of FIG. 7.

A structure for connecting positive and negative tabs 1a, 2a of the flat battery cell $B_2$ to the circuit board 6 is designed as illustrated in FIG. 11.

Specifically, the flat battery cell (flat battery cell $B_2$ in FIG. 11) is arranged in the lower case 24, and a circuit board 6 is accommodated in a space 8 between the lower case 24 and the flat battery cell. The circuit board 6 is formed with lands 6d, 6e on the surface thereof, such that the land 6e is connected to the positive tab 1a, and the land 6d to the negative tab 2a, respectively.

The connection of the lands with the positive and negative tabs can be made for example by ultrasonic welding. Alternatively, the lands and the tabs may be adhered with an electrically conductive adhesive coated on connection surfaces thereof.

Since this connection structure eliminates the need for drawing terminals, having a two-dimensional size at least identical to the positive and negative tabs, out of the circuit board 6, a dead space within the container can be reduced to result in a smaller battery pack.

Next, a battery pack according to a third embodiment of the present invention will be described with reference to FIG. 12.

Figure 12:
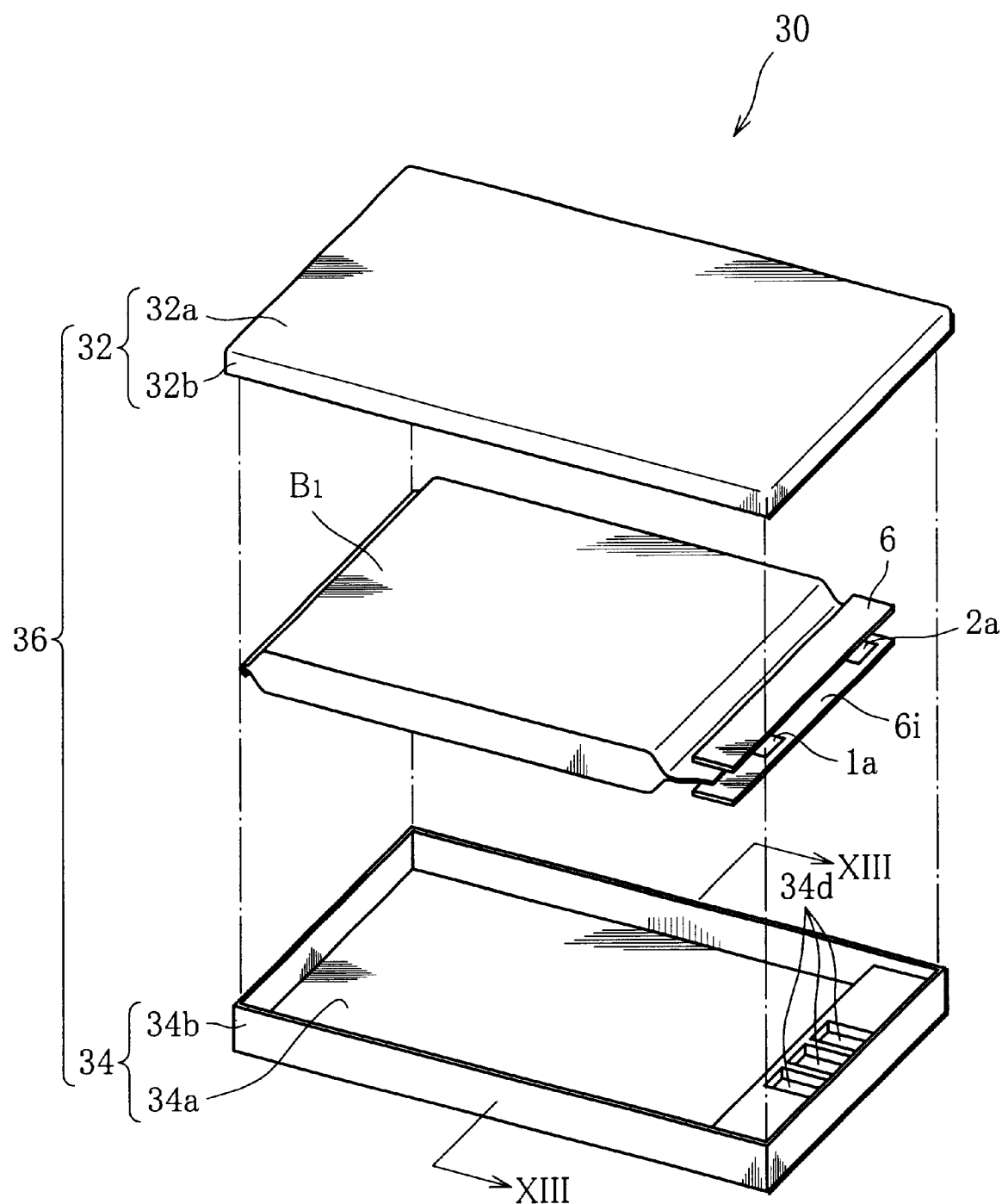
FIG. 12 is a perspective view illustrating a battery pack according to a third embodiment of the present invention.

In FIG. 12, the illustrated battery pack 30 comprises a container 36 made by mating a rectangular upper case 32 formed of a metal plate (having a thickness of 0.1 mm) made of stainless steel with a trout-shaped lower case 34 (having a height of approximately 4.0 mm) which has a metal plate 34a (having a thickness of 0.1 mm) made of stainless steel that is insert molded into a frame 34b. A flat battery cell $B_1$ or $B_2$ ($B_1$ in FIG. 12) and a circuit board 6 are contained in the container 36.

The upper case 32 includes an upper wall 32a, and a side wall 32b which extends orthogonal to the upper wall 32. In a plan view, the configuration of the lower case 34 is slightly larger than the upper case 32. Positive and negative tabs 1a, 2a are interposed between the circuit board 6 and a terminal base 6i.

Figure 13:
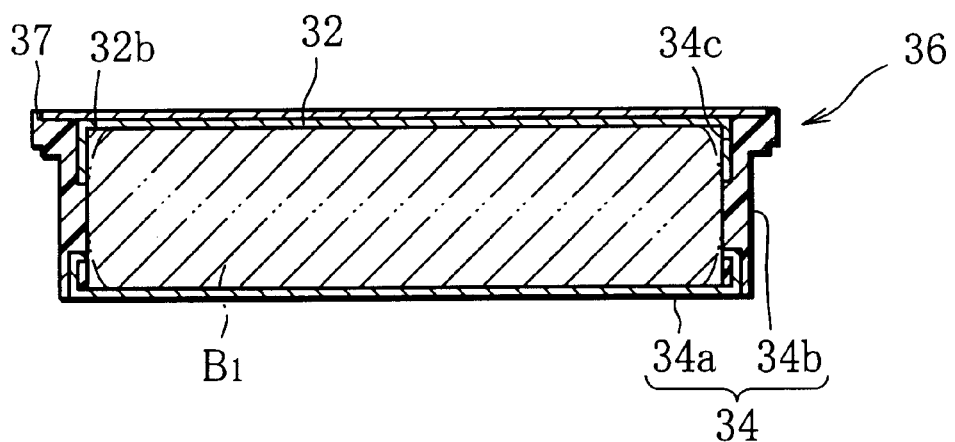
FIG. 13 is a cross-sectional view taken along the line XIII—XIII in FIG. 12.

Then, as illustrated in FIG. 13, the frame 34b of the lower case 34 is formed with a step 34c on the inner surface of an end wall, and the side wall 32b of the upper case 32 is fitted into the step 34c, for example, by press fitting. The spacing between the inner surface of the upper case 32 and the inner surface of the lower case 34 is maintained at 3.8 mm, and the thickness of the overall container 36 (battery pack) is regulated to be 4.0 mm. In addition, a label 37 is attached on the outer surface of the upper case 32 as required. With this container, since the upper case can be mated with the lower case only by press fitting, works such as welding is eliminated.

Figure 14:
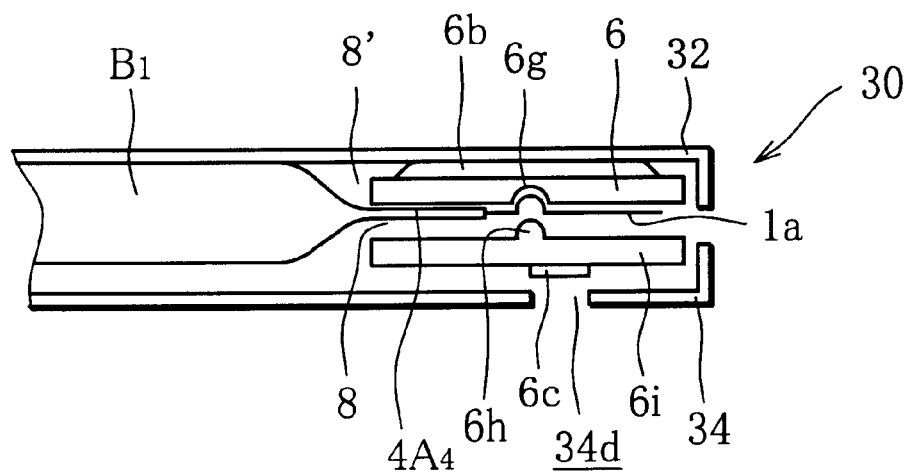
FIG. 14 is an exploded cross-sectional view illustrating a structure for connecting a flat battery cell to a circuit board in the battery pack of FIG. 12.

With this battery pack 30, a structure for connecting the flat battery cell to the circuit board is formed as illustrated in FIG. 14. Specifically, a space 8' formed by the upper case 32 and the sealing $4A_4$ accommodates the circuit board 6 which has recessed terminals 6g formed in the lower surface (the surface opposite to that on which a molding 6b for mounting parts is located). In this event, the positive and negative tabs 1a, 2a (1a is only shown in FIG. 14) of the flat battery cell $B_1$ are positioned below the recessed terminals 6g.

Then, a terminal base 6i having a protrusion 6h formed on the top surface and shaped complementary to the recess 6g, and leads 6c formed on the bottom surface is positioned below the sealing $4A_4$. Next, the circuit board 6 and the terminal base 6i are pressed into contact to sandwich the positive and negative tabs 1a, 2a between the protrusion 6h and the recessed terminals 6g to form electric connection between the flat battery cell $B_1$ and the circuit board 6. Subsequently, the lower case 34 having windows 34d at locations corresponding to the leads 6c is prepared and attached to the upper case 32 to complete the battery pack 30.

Likewise, in this embodiment, since the terminal base 6i is accommodated in the space 8 formed by the lower case 34 and the sealing $4A_4$, a dead space in the battery pack can be effectively utilized.

Next, a battery pack according to a fourth embodiment of the present invention will be described with reference to FIG. 15.

Figure 15:
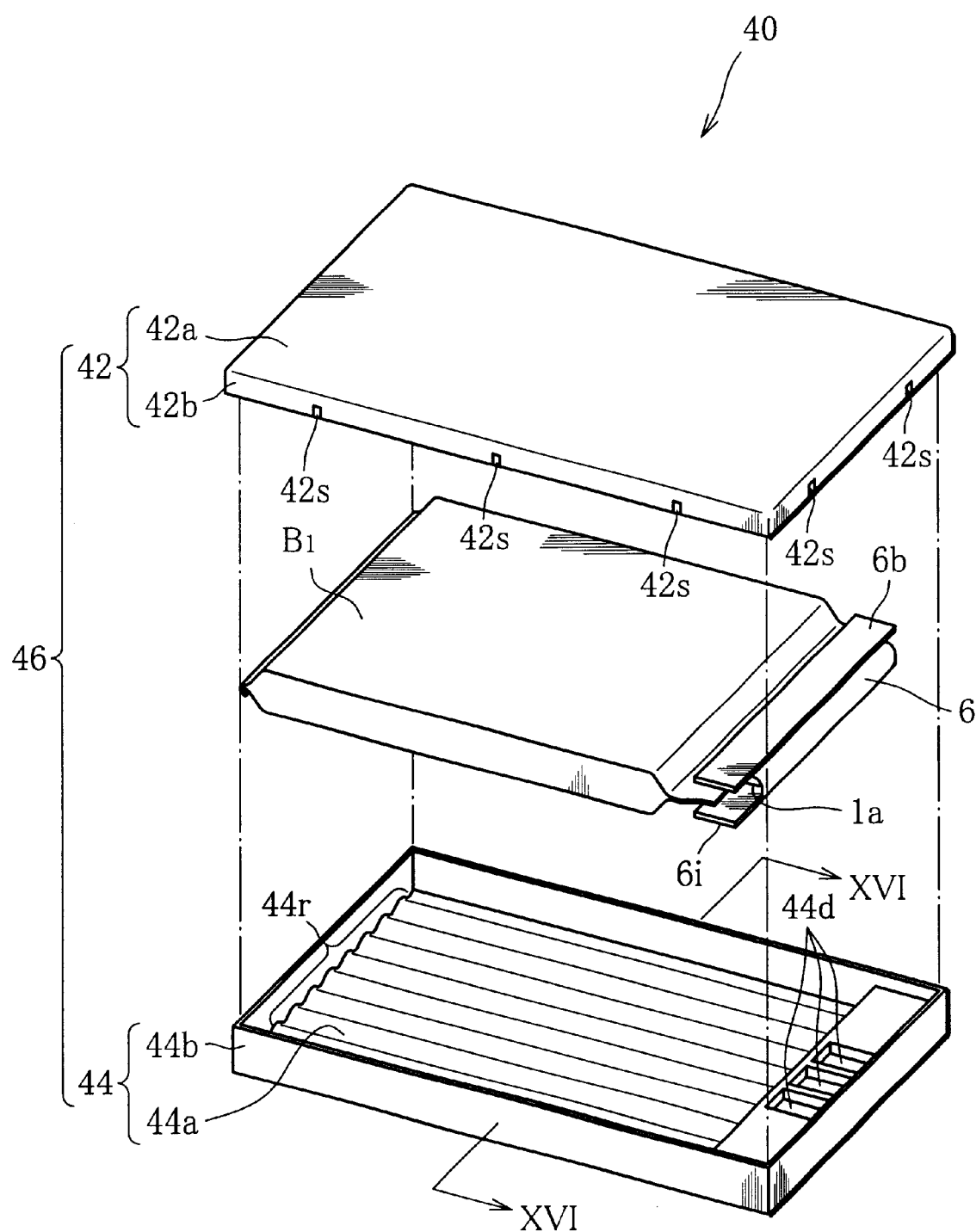
FIG. 15 is a perspective view illustrating a battery pack according to a fourth embodiment of the present invention.

In FIG. 15, the illustrated battery pack 40 comprises a container 46 formed by mating an upper case 42 substantially identical to the upper case 32 in FIG. 12 with a lower case 44 substantially identical to the lower case 34 in FIG. 12; and a flat battery $B_1$ and a circuit board 6 contained in the container 46.

The battery pack 40, however, differs in that a side wall 42b of the upper case 42 is formed with a plurality of stoppers (spikes) 42c at appropriate intervals which open or extend after they are fitted into a frame 44b of the lower case 44 for ensuring a close contact between the upper case 42 and the lower case 44. Also, a metal plate 44a in the lower case 44 is formed with multiple ribs 44r which appear as corrugated when the container 46 is viewed from the short side direction.

Figure 16:
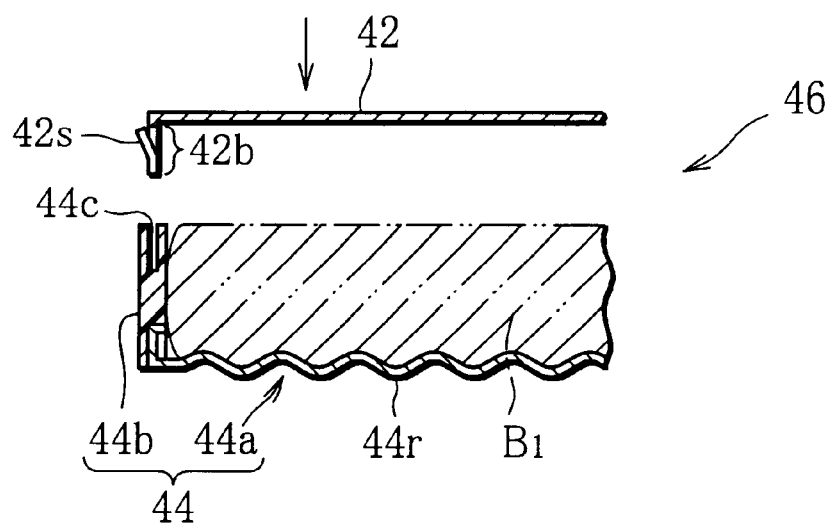
FIG. 16 is a cross-sectional view taken along the line XVI—XVI in FIG. 15.

Then, as illustrated in FIG. 16, the frame 44b is formed with a recess 44c of 0.2 mm wide, deep into the end surface thereof. The side wall 42b of the upper case 42 is fitted into the recess 44c, with the stoppers 42s extending in the recess 44c to allow the side wall 42b to be in close contact with the frame 44b. This structure enables the upper case 42 to be more firmly mated with the frame 44b. Also, since the metal plate 44a is formed with the ribs 44r, the metal plate 44a can be reduced in thickness while ensuring an appropriate strength characteristic to reduce the weight of the overall container 46.

Figure 17:
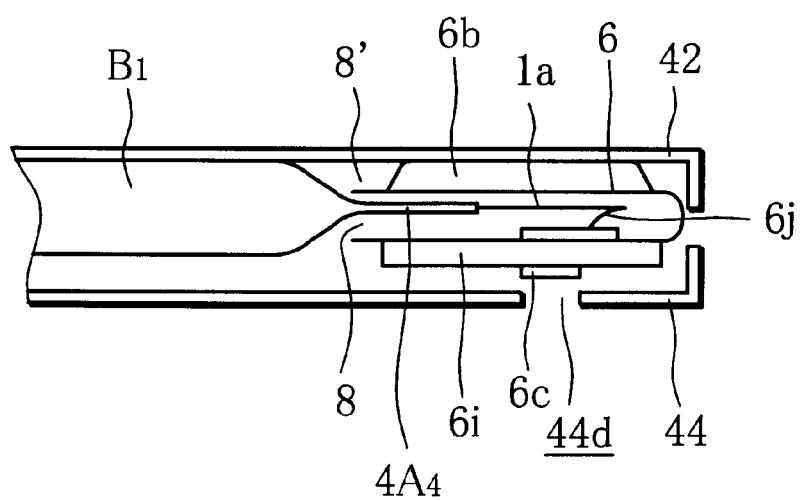
FIG. 17 is an exploded cross-sectional view illustrating a structure for connecting a flat battery cell to a circuit board in the battery pack of FIG. 15.

This battery pack 40 is formed with a structure for connecting the flat battery cell to the circuit board as illustrated in FIG. 17. In this case, a flexible circuit board is used as the circuit board 6. The flexible circuit board 6 has a mount molding 6b, in which circuit parts are molded with resin, and a terminal base 6i loaded on one side, and terminals 6j formed on the other side.

The flexible circuit board 6 is bent such that it passes outside the positive and negative tabs 1a, 2a (1a is only shown in FIG. 17), and the mount molding 6b is accommodated in a space 8' formed by the upper case 42 and the sealing $4A_4$, while other portions are placed in a space 8 formed by the sealing $4A_4$ and the lower case 44. As a result, the terminal base 6i is positioned below the sealing $4A_4$. Then, the positive and negative tabs 1a, 2a are electrically connected to the terminals 6j, for example, by ultrasonic welding.

Subsequently, the lower case 44 formed with windows 44d at locations corresponding to the leads 6c is prepared and attached to the upper case 42 to complete the battery pack 40.

Likewise, the battery pack 40 realizes a reduction in overall size because the spaces 8, 8' are effectively utilized.

Next, a battery pack according to a fifth embodiment of the present invention will be described with reference to FIG. 18.

Figure 18:
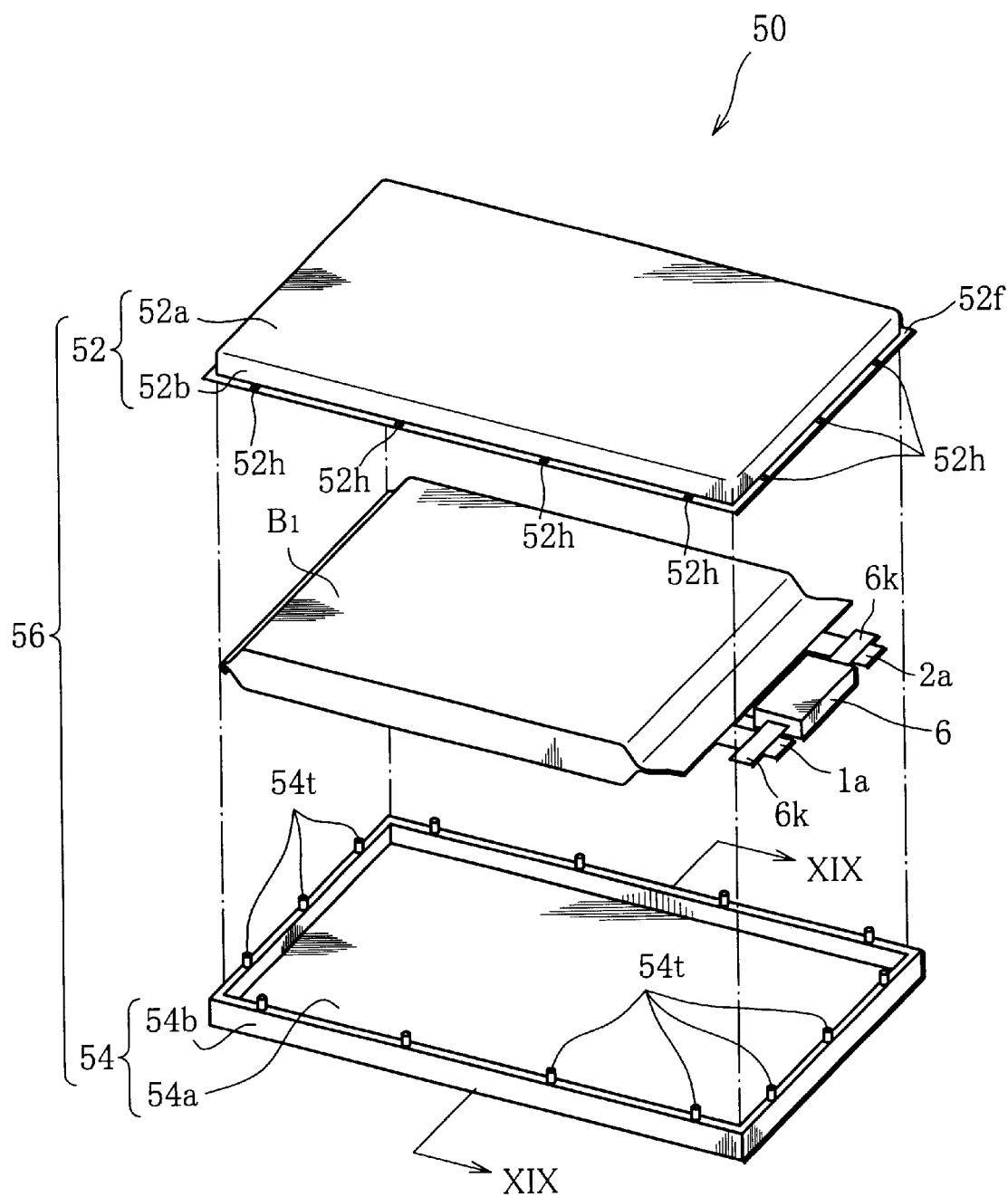
FIG. 18 is a perspective view illustrating a battery pack according to a fifth embodiment of the present invention.

In FIG. 18, the illustrated battery pack 50 comprises a container 56 formed by mating an upper case 52 substantially identical to the upper case 42 in FIG. 15 with a lower case 54 having a metal plate 54a insert molded into a frame 54b; and a flat battery cell $B_1$ or $B_2$ ($B_1$ in FIG. 18) and a circuit board 6 contained in the container 56.

A side wall 52b of the upper case 52 is formed with a flange 52f which in turn is formed with a plurality of holes 52h at appropriate intervals. Then, in the lower case 54, the frame 54b is formed with welding ribs 54t on the top surface at positions corresponding to the holes 52h.

Figure 19:
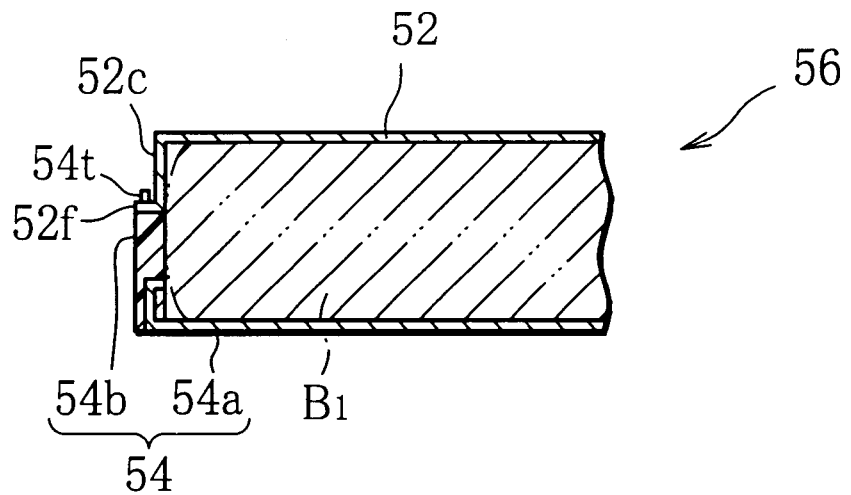
FIG. 19 is a cross-sectional view taken along the line XIX—XIX in FIG. 18.

Subsequently, as illustrated in FIG. 19, the welding ribs 54t formed on the end surface of the frame 54b are inserted into the holes 52h of the upper case 52, and heads of the welding ribs 54t are welded or crushed to mate the upper case 52 with the lower case 54.

Figure 20:
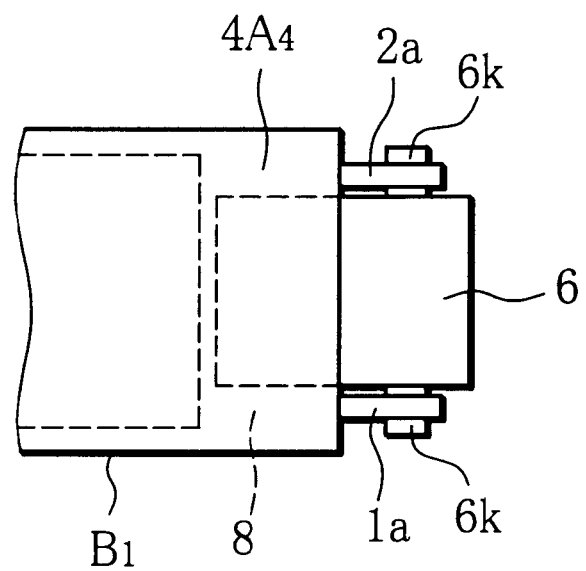
FIG. 20 is a plan view illustrating a structure for connecting a flat battery cell to a circuit board in the battery pack of FIG. 18.
Figure 21:
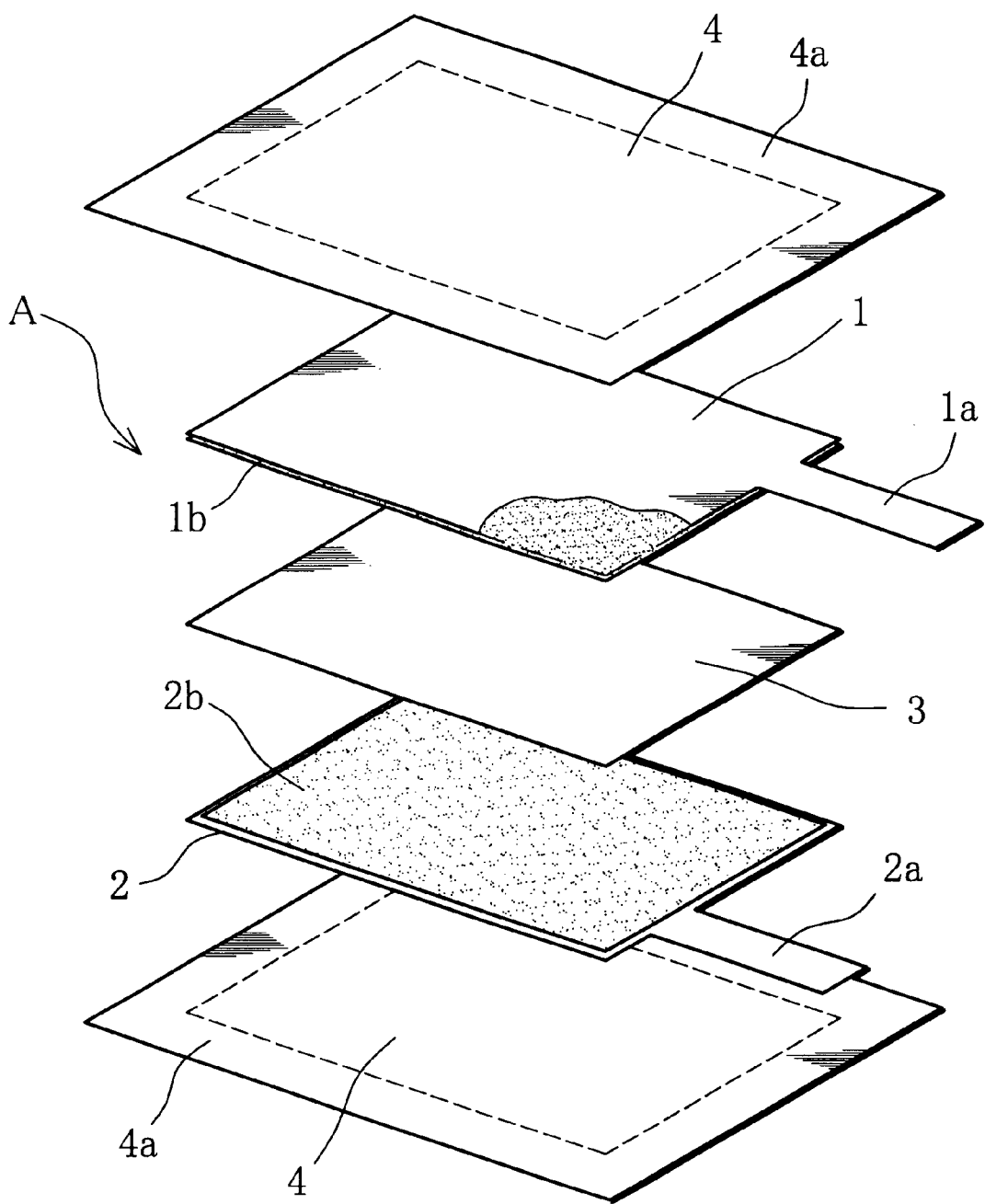
FIG. 21 is an exploded perspective view illustrating an example of a flat battery cell.
Figure 22:
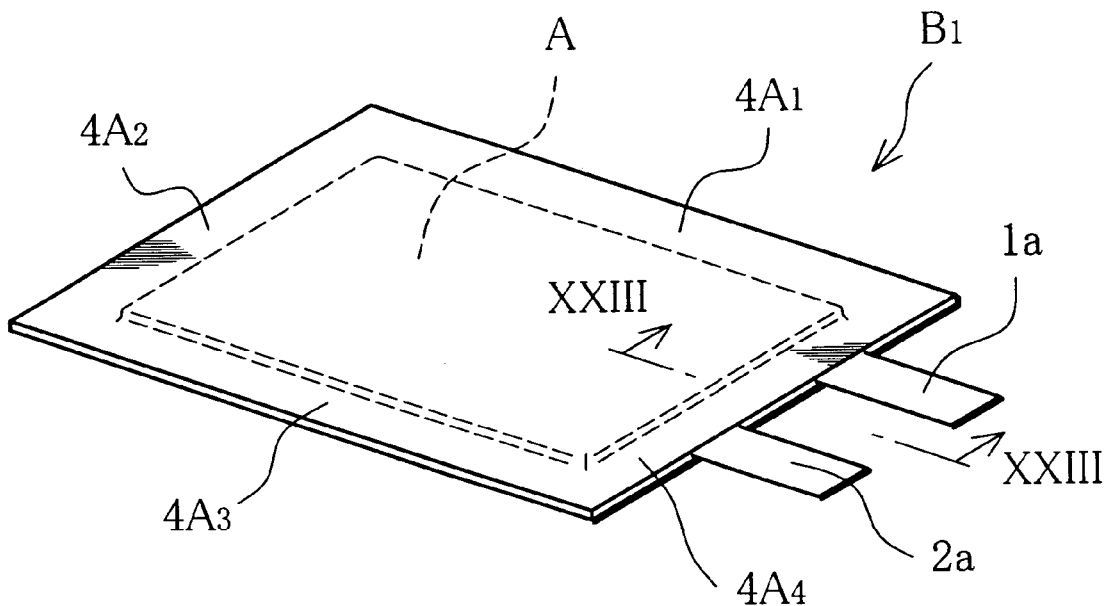
FIG. 22 is a perspective view of a flat battery cell composed of components illustrated in FIG. 21.
Figure 23:
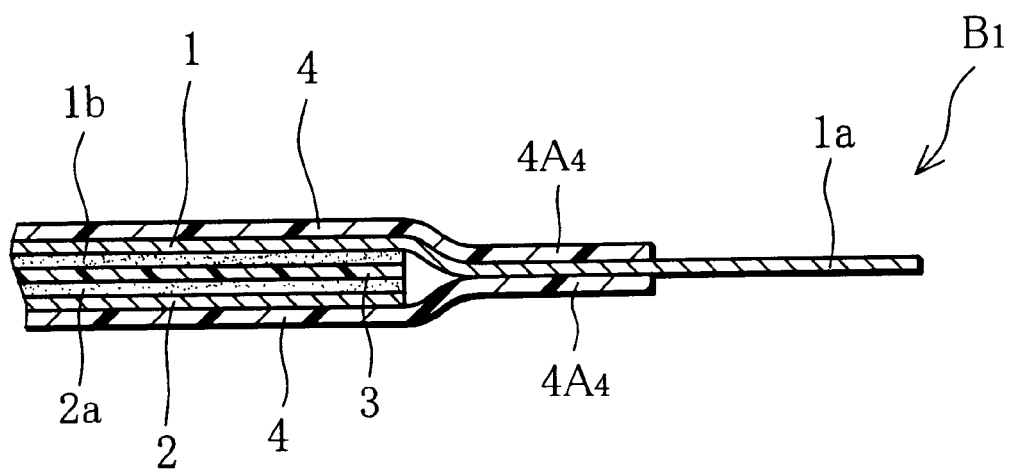
FIG. 23 is a cross-sectional view taken along the line XXIII—XXIII in FIG. 22.
Figure 24:
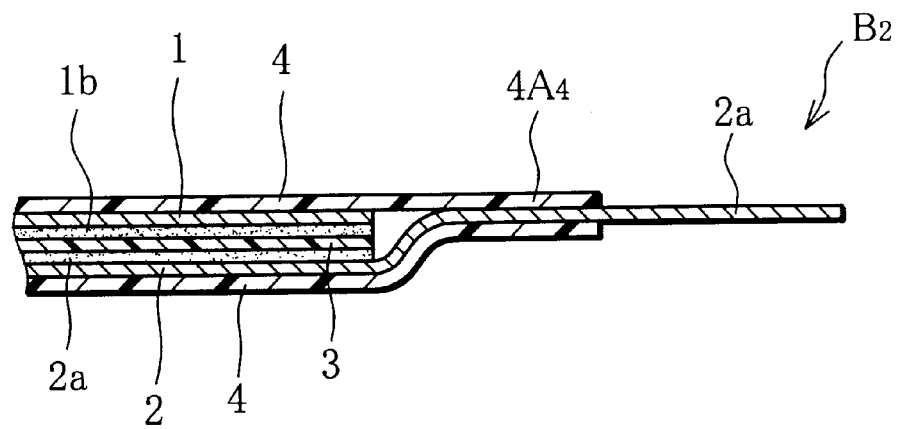
FIG. 24 is a cross-sectional view illustrating surroundings of a sealing of a flat battery cell which is manufactured by a sealing pressure applying method different from that for the battery cell illustrated in FIG. 23.

The battery pack 50 is formed with a structure for connecting the flat battery cell to the circuit board as illustrated in FIG. 20. Specifically, a space 8 below a sealing $4A_4$ accommodates the circuit board 6 having a pair of tongue-like terminals 6k extending from longitudinal sides, and the flat battery cell $B_1$ or $B_2$ has a positive tab 1a and a negative tab 2a connected to corresponding terminals 6k.

For connecting the positive and negative tabs to the terminals, ultrasonic welding or a conductive adhesive may be used. In the alternative, the positive and negative tabs may be wound around the terminals, and the wound portions may be fixed by mechanical means such as clipping, pinning, or the like.

The battery packs according to the first to fifth embodiments may be altered in various manners.

For example, the combination of the connection structure comprised of the flat battery cell and the circuit board and the container is not limited to those shown in the first to fifth embodiments. For example, the connection structure in the battery pack 20 may be accommodated in the container 16 in the battery pack 10.

Also, the container may be altered in various manners. For example, while in the battery pack 10 of FIG. 1, one of the first and second case halves of the container is implemented as an upper case, and the other one is implemented as a lower one, the container may be composed of a left case and a right case. In this case, a pair of metal plates, for example, are arranged in opposition to each other, with a frame attached therebetween to form the respective cases, and openings are formed through opposing surfaces of both the cases. Then, a left half of a flat battery cell is placed into the left case from the opening of the left case, and a right half of the flat battery cell is next placed into the right case from the opening of the right case, followed by mating both the cases with each other.

In this alteration, the metal plates used in the respective cases are not limited to the aforementioned aluminum plates or stainless plates. Alternatively, aluminum alloy plates, magnesium alloy plates, cold rolled steel plates, hot rolled steel plates, and plated steel plates may be used by way of example. The thickness of the metal plates may be, for example, in a range of 0.05 to 0.25 mm.

As illustrated in FIG. 2, the metal plates 12a, 14a are formed with the side walls 12L, 14L for permitting the metal plates 12a, 14a to be insert molded into the frame in the first and second case halves. For forming the side walls, bending, drawing and so on may be applied. Particularly, the drawing is preferred because the worked metal pates are free from bowing and twisting if the drawing is applied.

Further, the ribs formed on the metal plates are not limited to the corrugated shape in cross-section, but may be formed in trapezoid. Further alternatively, the metal plates may be applied with an embossed texture instead of the ribs, and similar effects can be produced. In addition, the metal plates may be formed with a plurality of openings (not shown) in the surfaces without changing the thickness to further reduce the weight.

In the battery pack 20 of FIG. 7, on the other hand, the upper case (first case half) is not limited to that made of resin, but may be made, for example, of metal. With the upper case made of metal, a metal plate may be pressed to fabricate the first case half. Alternatively, the first case half may be cast by injection molding or the like. Metal materials used for the first case half may include aluminum, stainless steel, aluminum alloy, magnesium alloy, cold rolled steel plate, hot rolled steel plate, plated steel plate, and so on.

Then, as a metal plate used for the second case half, similar metal plates to those mentioned above may be used.

It should be noted that in the battery pack 20, when the first case half is made of metal, the second case half for use in combination with this must be such one that is composed of a metal plate and a resin frame attached integral with the metal plate. Alternatively, when the first case half is made of resin, the second case half may be formed only of a metal plate as is the case of FIGS. 12, 15 and 18.

Resin materials suitably used for the first case half and the frame of the battery pack 20 may be thermoplastic resin materials. For example, thermoplastic resin materials such as polycarbonate, liquid crystal polymer, a compound of polycarbonate and acrylic butadiene styrene rubber, polypropylene, polybutylene terephthalate, polyphenylene sulfide, and so on may be used.

In this event, while such thermoplastic resin may be used alone, glass components such as chopped glass fiber, glass beads may be mixed in the thermoplastic resin, in which case such a resin composition suffers less contraction after molding, so that the resulting first case half and frame after the molding are preferred because they can ensure target dimensions and simultaneously a higher strength.

Particularly, polycarbonate or liquid crystal polymer is preferably used as the thermoplastic resin material because the aforementioned effects are exhibited.

For preparing the resin composition, glass components such as chopped glass fiber and glass beads are preferably loaded in a range of 10 to 25 volume %.

Loading of less than 10 volume % will not increase so much the strength of the molded first case half and frame, so that the resulting first case half and frame may experience bowing and twisting when they receive an external force. On the contrary, loading of more than 25 volume % would result in higher susceptibility to failed molding during the insert mold process, and the resulting first case half and frame, after molding, would exhibit poor flexibility.

The frame integrated with the side wall of the metal plate preferably has a thickness in a range of 0.6 to 1.5 mm when the metal plate has a thickness of 0.1 mm.

While the foregoing embodiments have been described for a particular structure in which the leads extending from the circuit board are exposed through the windows formed through the container, the leads may be previously formed on the container so that the leads are connected to the circuit board within the container. In this case, the surface of the metal plate, which forms the inner surface of the container, may be coated with a resin sheet or the like, as required, to insulate the flat battery cell and the circuit board contained therein.

Further, the manner of attaching the frame integral with the metal plate is not either limited to the aforementioned insert mold. Alternatively, the metal plate may be fitted into the frame, or the two components may be adhered.

Figure 32:
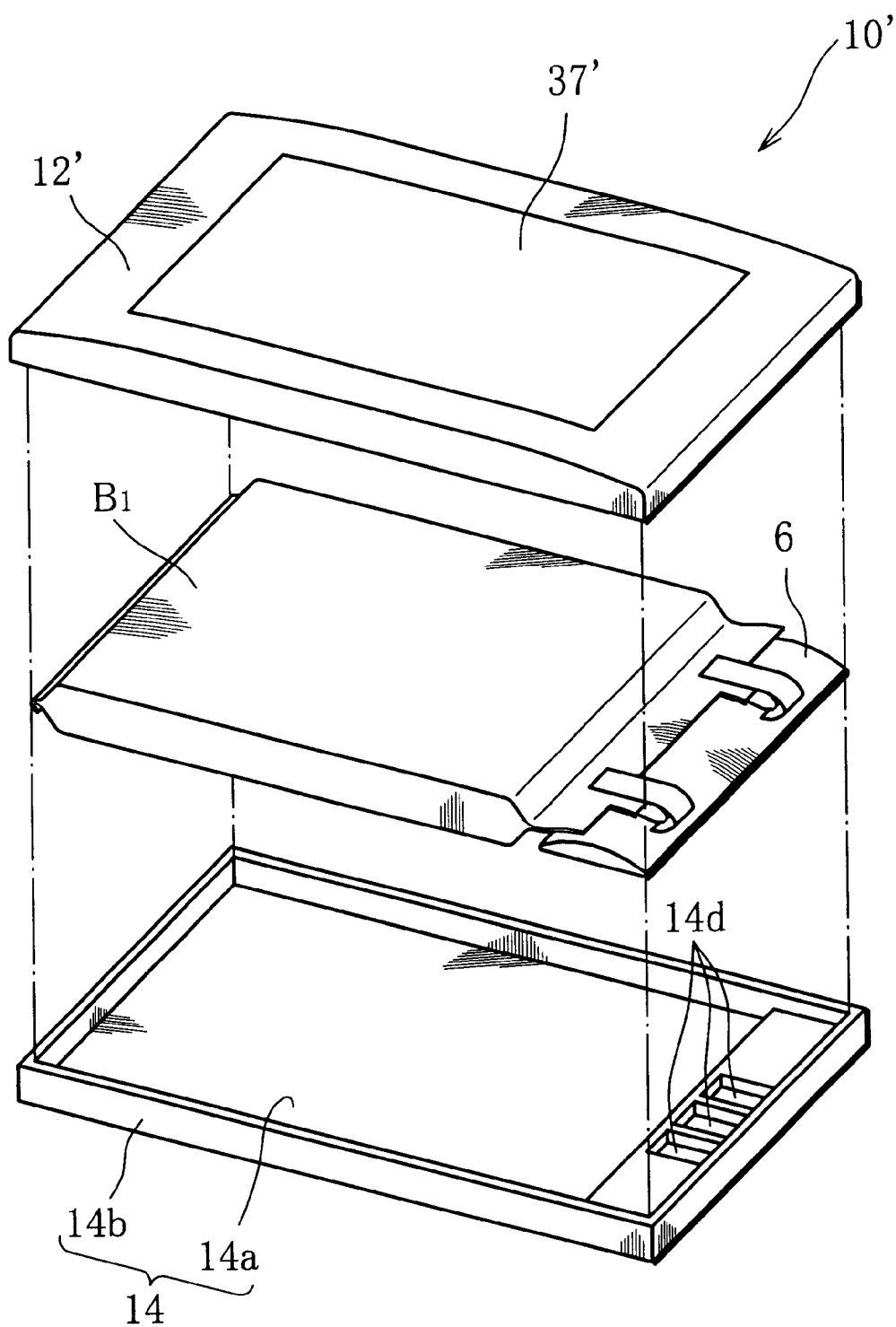
FIG. 32 is an exploded perspective view illustrating a battery pack according to a sixth embodiment of the present invention.

In the following, a sixth embodiment of the present invention will be described with reference to FIGS. 32 and 33.

The illustrated battery pack 10' is basically configured in a manner similar to the battery pack 10 of FIG. 1, but differs in that an upper case 12' is formed of a resin molding, and a thin metal label 37' corresponding to the label 37 in FIG. 12 is adhered on the outer surface of the upper case 12'.

Figure 33:
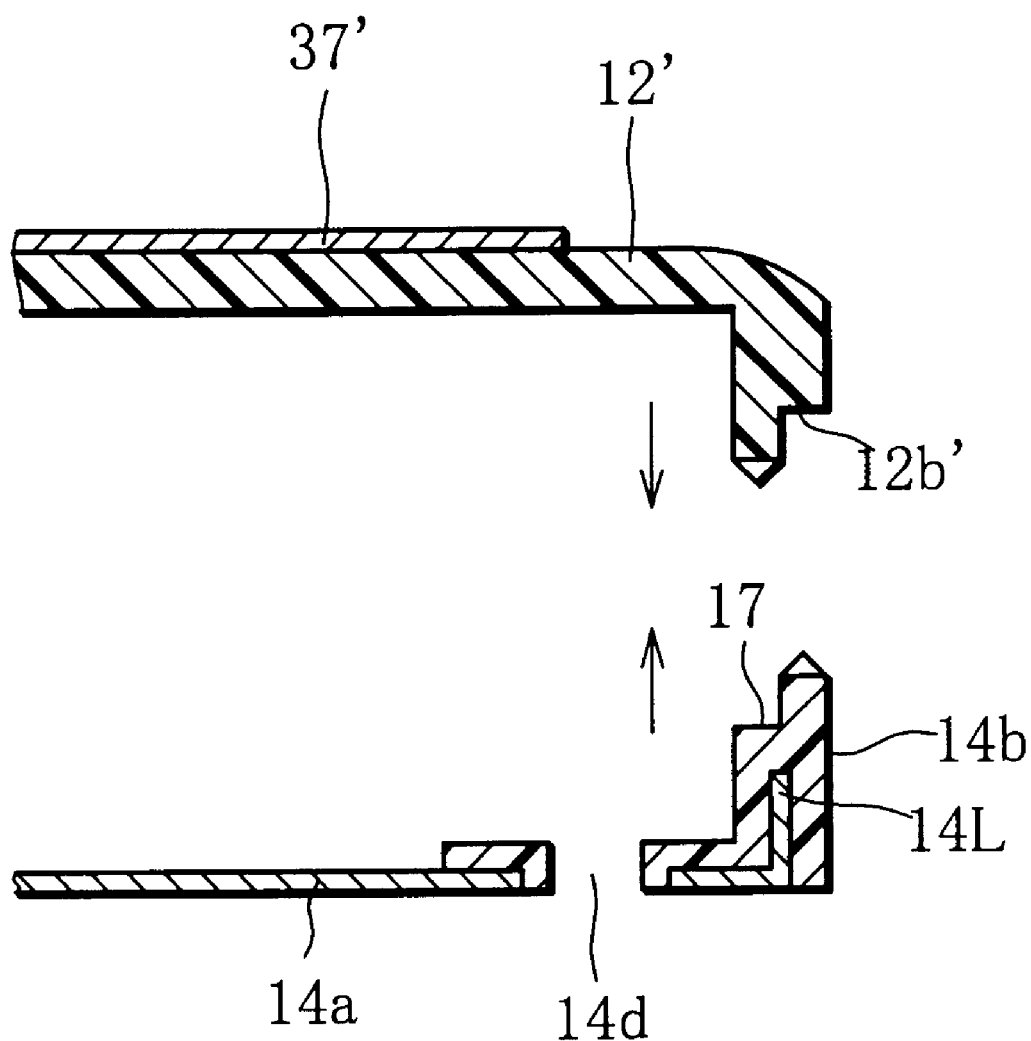
FIG. 33 is a partial enlarged cross-sectional view of a container illustrated in FIG. 32.

As illustrated in FIG. 33, a lower case 14 of the battery pack 10' is such that a resin material is insert molded on a side wall 14a of the metal plate 14a, when a frame 14b is formed, to integrate the metal plate 14a with the frame 14b.

Here, the metal plate 14a may be implemented by using, for example, a stainless steel plate, aluminum plate, aluminum alloy plate, magnesium alloy plate, cold rolled steel plate, hot rolled steel plate, plated steel plate, or the like. Moreover, the metal plate 14a has a thickness in a range of 0.05 to 0.2 mm for simultaneously achieving an appropriate strength characteristic and a reduced thickness of the lower case 14. The frame 14b, in turn, may be formed of a resin material which may be selected as required from thermoplastic resin material such as polycarbonate, liquid crystal polymer, a compound of polycarbonate and acrylic butadiene styrene rubber, polypropylene, polybutylene terephthalate, polyphenylene sulfide, and so on.

In this event, while such thermoplastic resin may be used alone, glass components such as chopped glass fiber, glass beads may be mixed in the thermoplastic resin, in which case such a resin composition suffers less contraction after molding, so that the resulting first case half and frame after the molding are preferred because they can ensure target dimensions and simultaneously a higher strength. For preparing such a resin composition, it is preferable to blend 10 to 25 volume % of glass components such as chopped glass fiber and glass beads.

The thickness of the frame 14b is set to such a value that ensures that the side wall 14L of the metal plate 14a is firmly fixed and has a proper strength characteristic. Specifically, the thickness is preferably in a range of 0.7 to 1.5 mm when the metal plate 14a has a thickness, for example, in a range of 0.05 to 0.2 mm.

The upper case 12' in turn is a resin molding generally in the shape of thin box on which a metal label 37' is adhered by coating an acrylic-based adhesive on the outer surface thereof or by using a double-side adhesive tape.

The label 37' may be made of, for example, stainless steel foil, aluminum foil or the like. The label 37' runs counter to a reduction in overall thickness if it is too thick, and results in a lower strength characteristic if it is too thin, so that the thickness of the label 37' is preferably in a range of 50 to 150 μm.

Then, an integrated assembly comprised of a flat battery cell and a protection circuit board is placed in the lower case 14, the upper case 12' is put on the lower case 14, and the frame 14b of the lower case and the periphery of the upper case are bonded along their contact faces to integrate both the cases, thereby completing the assembly into the battery pack of the present invention.

In this event, as illustrated in FIG. 33, the frame 14b of the lower case is previously formed with a step 17 at a location to which the upper case abuts, while the upper case is formed with a step 12'b at a location to which the lower case abuts. Then, both the cases are engaged at their steps, followed by an ultrasonic welding applied thereto to bond the upper and lower case for integration.

The battery pack of the present invention provides the following effects:

(1) Since the lower case forming part of the battery pack of the present invention comprises a side wall formed of a resin-made frame, and a bottom wall made of a metal plate that is insert molded into the frame, the lower case exhibits a better strength characteristic as compared with a lower case generally formed of a resin molding.

In other words, the strength characteristic required to the lower case is ensured even if the thickness of the metal plate is reduced, so that the lower case of the present invention can have a larger inner volume as compared with a lower case generally formed of a resin molding.

(2) The upper case of the battery pack of the present invention, though generally formed of a resin molding, has a metal label adhered on the outer surface thereof, so that the upper case has an improved strength characteristic as compared with an upper case without such a label adhered thereon. Therefore, the upper case can also reduce the wall thickness while ensuring an appropriate strength characteristic, thereby making it possible to increase the inner volume.

(3) Consequently, the inner volume of the entire case, when the lower case and the upper case are combined, is larger as compared with conventional cases which are entirely made of resin. This means that the battery pack can accommodate a thicker flat battery cell, i.e., a flat battery cell having a higher capacity.

Conversely speaking, a thicker flat battery can be accommodated in the battery pack without increasing the thickness of the overall battery pack. In other word, it is possible to assemble a high capacity battery pack even if it appears generally thin.

It should be noted that the configuration of the upper case may be replaced with the configuration of the lower case in the foregoing description, while the configuration of the lower case may be replaced with the configuration of the upper case in the foregoing description.

In the following, a battery pack according to a seventh embodiment of the present invention will be described with reference to FIGS. 34 to 41.

Figure 26:
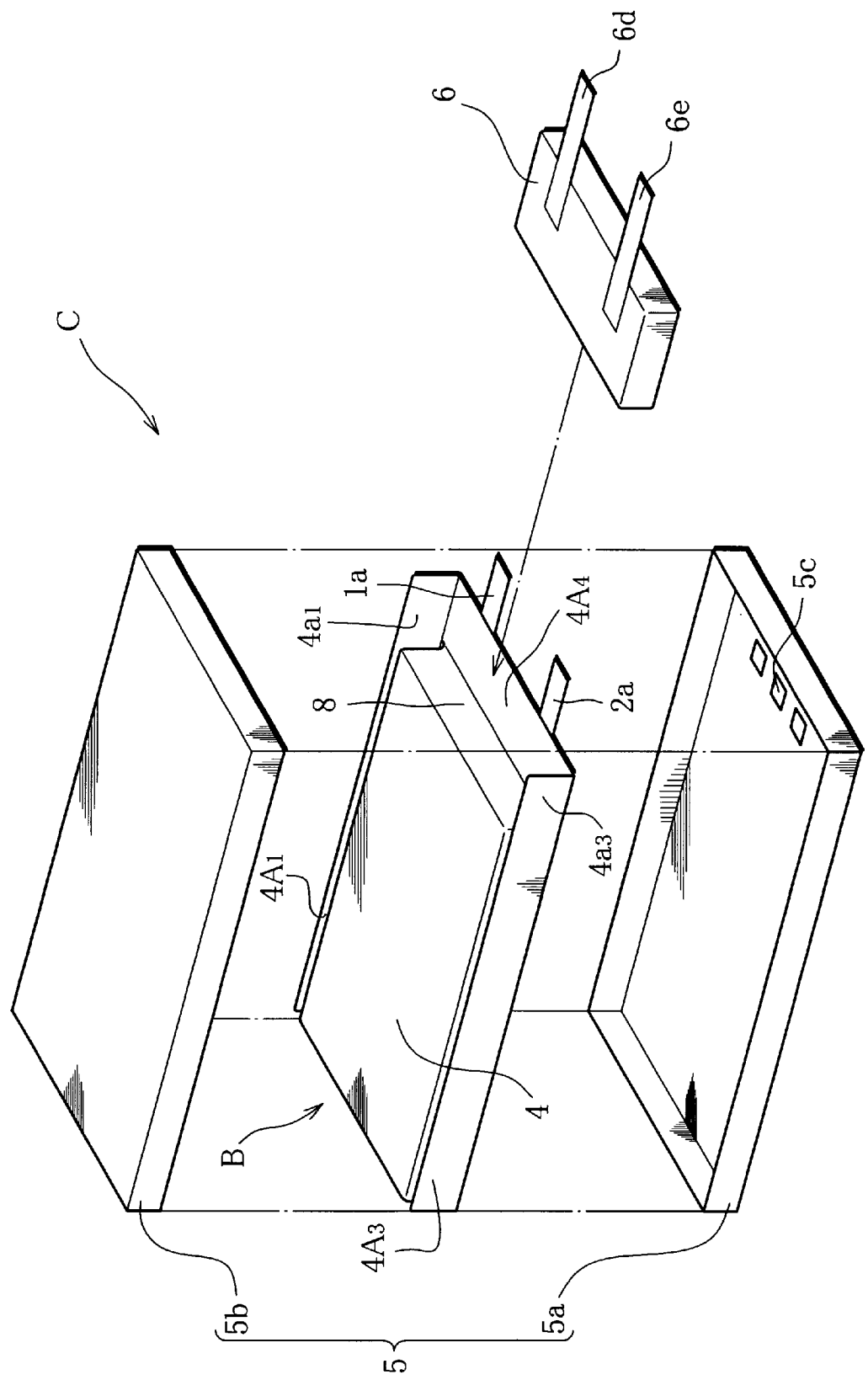
FIG. 26 is an exploded perspective view of a battery pack which was devised prior to the creation of the present invention.
Figure 34:
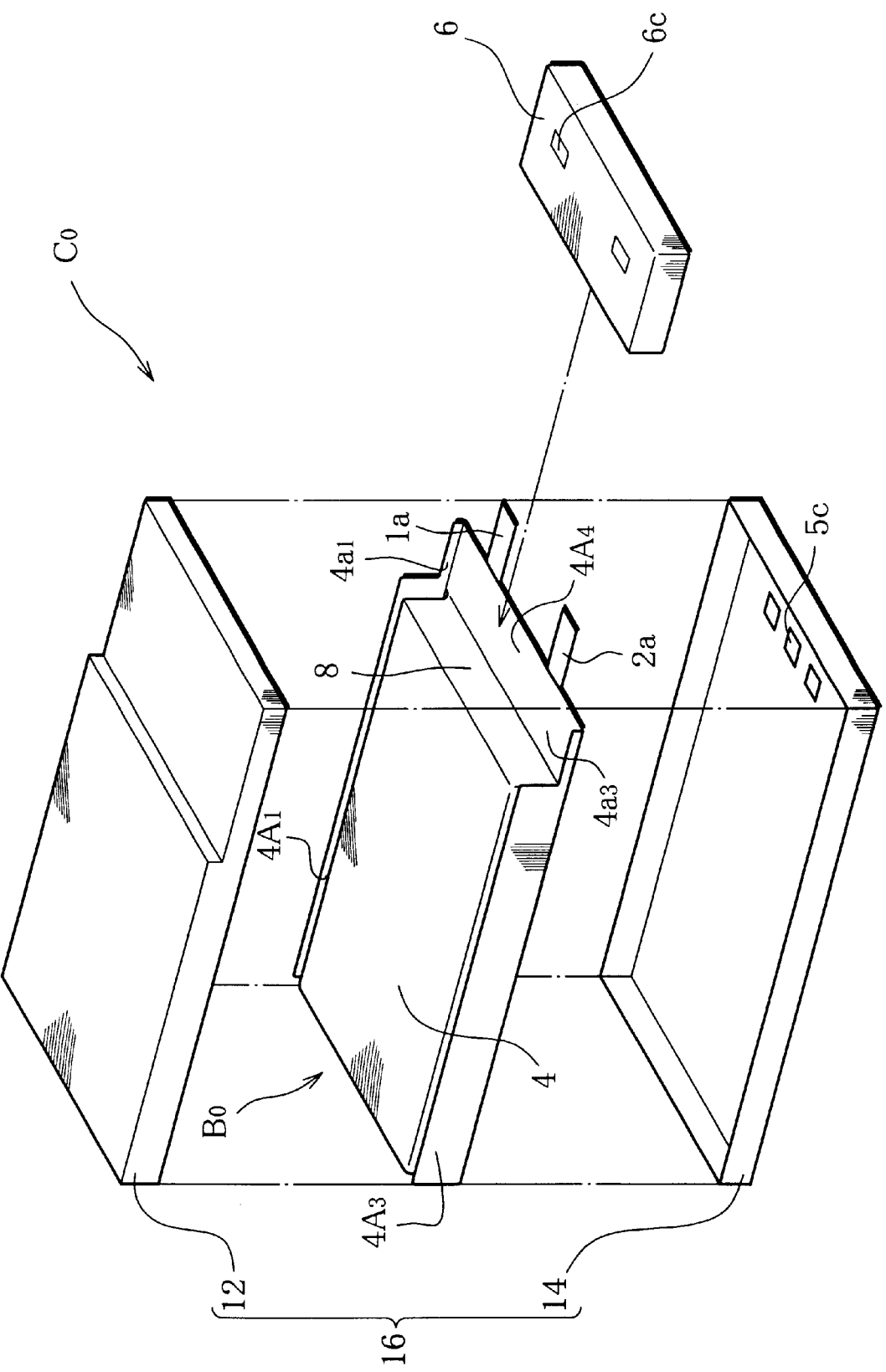
FIG. 34 is an exploded perspective view illustrating a battery pack according to a seventh embodiment of the present invention.
Figure 35:
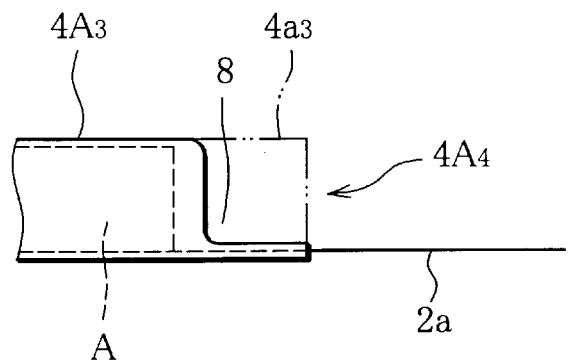
FIG. 35 is a partial cross-sectional view illustrating peripheral sealings of a flat battery cell and their surroundings in the battery pack illustrated in FIG. 34.

As illustrated in FIGS. 38 to 41, a flat battery cell Bo for use with the battery pack Co of this embodiment is identical to that illustrated in FIGS. 21 to 24 in basic configuration, but differs in that a sheet of armor material 4 is folded in two, and used to wrap an electric power generating element A. In addition, as illustrated in FIGS. 34 and 35, this flat battery cell Bo has cut away a majority of screens $4a_1$, $4a_3$ in the flat battery B illustrated in FIG. 26.

Figure 27:
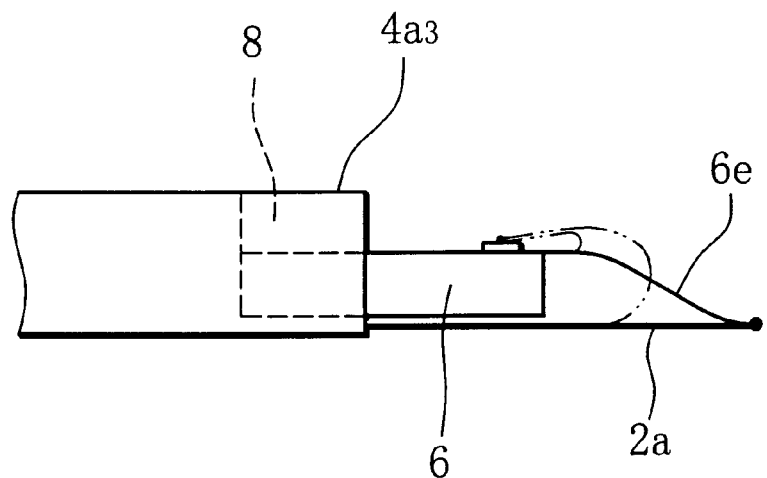
FIG. 27 is a side view for explaining how positive and negative tabs connected with tab leads are accommodated in a space above a circuit board in the battery pack illustrated in FIG. 26.
Figure 28:
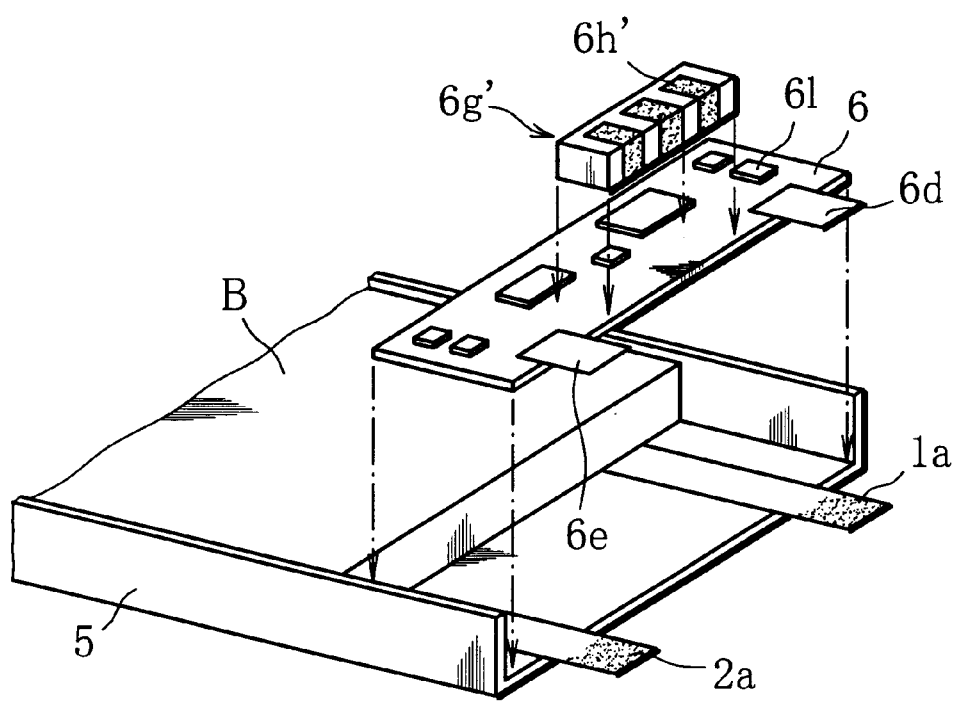
FIG. 28 is an exploded perspective view illustrating a main portion of a battery pack which was devised prior to the creation of the present invention.
Figure 29:
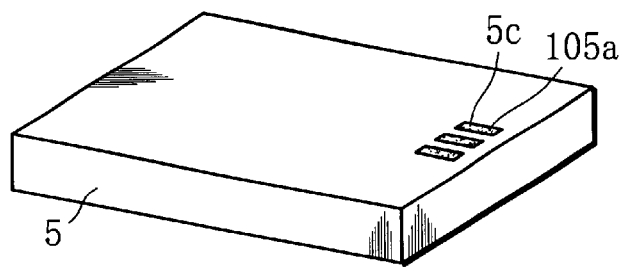
FIG. 29 is a perspective view of the battery pack illustrated in FIG. 28.
Figure 30:
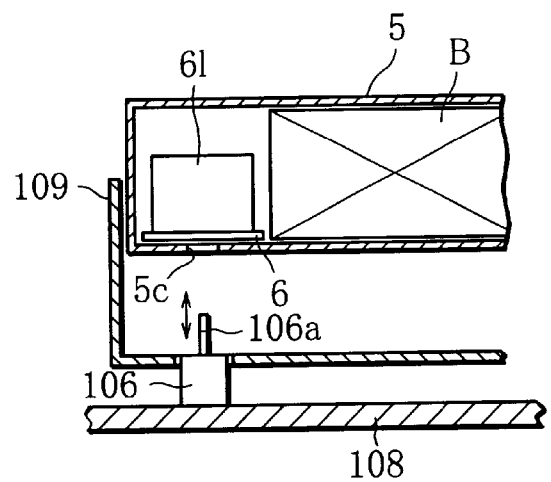
FIG. 30 is a partial cross-sectional view illustrating an example of how the battery pack of FIG. 28 is mounted in an electronic device.
Figure 31:
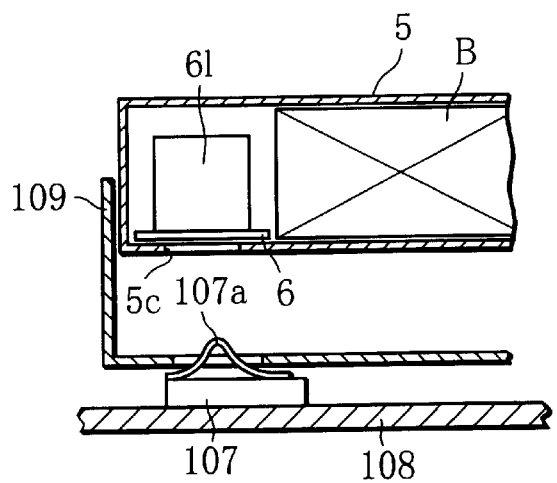
FIG. 31 is a partial cross-sectional view illustrating another example of how the battery pack is mounted in an electronic device.
Figure 36:
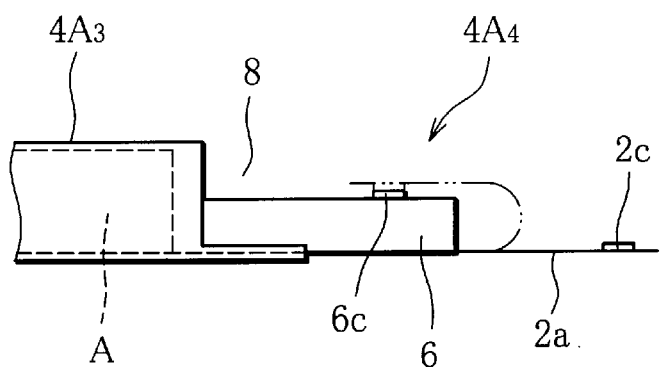
FIG. 36 is a partial side view for explaining how a circuit board is positioned adjacent to the peripheral sealing illustrated in FIG. 35.

As can be seen in FIG. 36, connection of positive and negative tabs to a circuit board 6 is established by positioning the circuit board 6 in a space 8, ultrasonic welding, for example, copper foil chips 2c on leading end surfaces of the positive tab and the negative tab, then folding the positive tab and the negative tab 2a upward as indicated by imaginary lines in FIG. 36, and, for example, soldering the copper foil chips 2c onto lead terminals 6c mounted on the circuit board. Thus, this embodiment does not employ the structure in which an assembly of tab leads extending from a circuit board connected to positive and negative tabs is bent, and positioned above the circuit board, as is the case of the battery pack C illustrated in FIGS. 26 and 27, so that the structure involved in the connection requires a smaller space in the thickness direction of the space 8. Conversely speaking, a larger available volume can be provided in the space between the upper case 12 and the top surface of the circuit board.

In addition, there is no screen beside a peripheral side $4A_4$ of the flat battery cell Bo, and a larger space is available in the space 8 as mentioned above, so that the upper case 12 of the battery pack Co can be reduced in the thickness dimension by a portion corresponding to the space 8. Specifically, as illustrated in FIG. 34, the configuration of the upper case 12 includes a step in the thickness direction.

Thus, when the battery pack Co is mounted, for example, in a portable telephone, the step-wise thin portion can be engaged with a contact of the portable telephone, thereby making it possible to stabilize a contact state therebetween.

Figure 37:
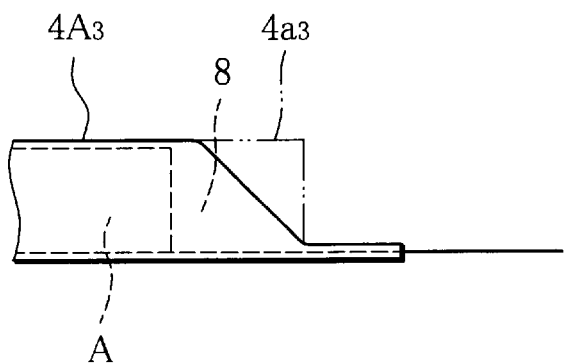
FIG. 37 is a partial cross-sectional view illustrating peripheral sealings of a flat battery cell according to a modified example of the seventh embodiment.
Figure 38:
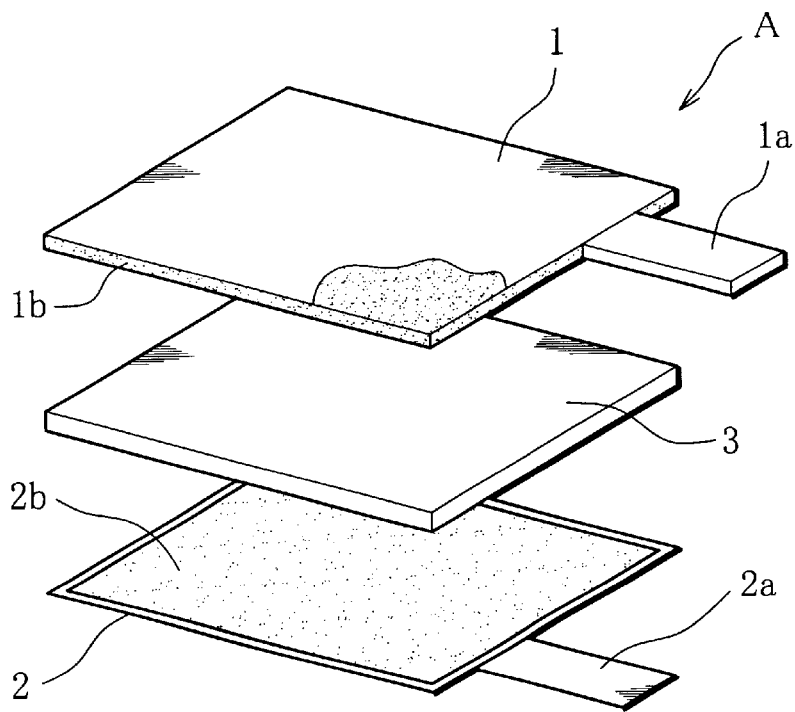
FIG. 38 is an exploded perspective view illustrating an electric power generating element of the battery pack illustrated in FIG. 34.
Figure 39:
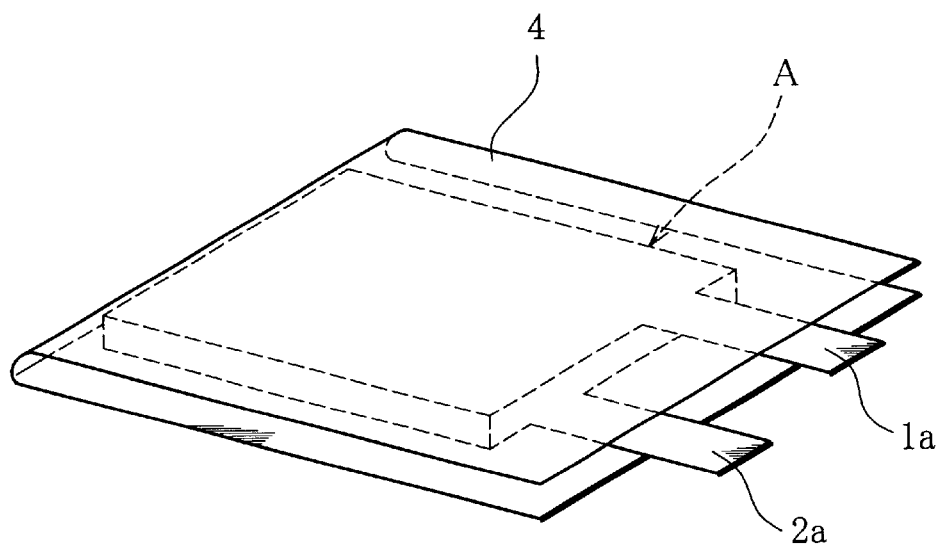
FIG. 39 is a perspective view illustrating the electric power generating element wrapped by a two-folded armor material.
Figure 40:
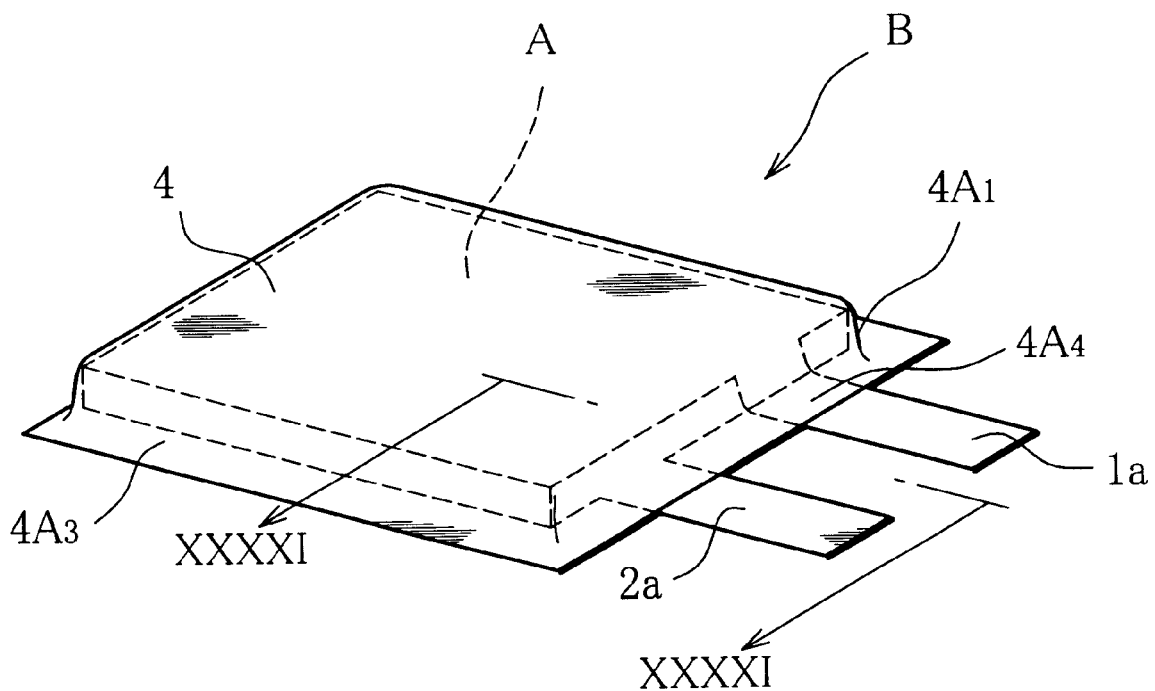
FIG. 40 is a perspective view illustrating three thermally fused peripheral sides of the armor material illustrated in FIG. 39.
Figure 41:
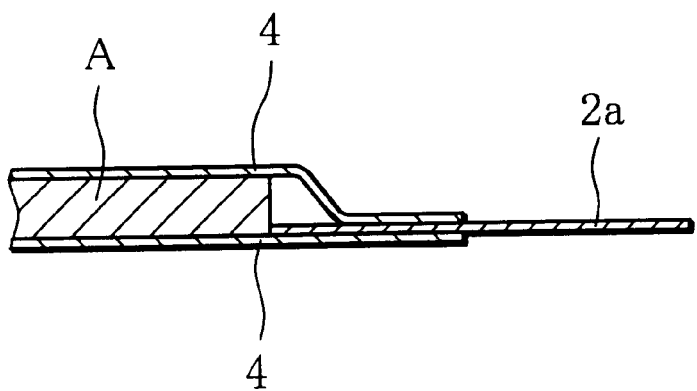
FIG. 41 is a cross-sectional view taken along the line XXXXI—XXXXI in FIG. 40.

While in the foregoing description, the screens $4a_1$, $4a_3$ are cut away substantially in rectangular form, they may be cut away in triangular form as illustrated in FIG. 37.

In the following, a battery pack according to an eighth embodiment of the present invention will be described with reference to FIGS. 42 and 43.

Figure 42:
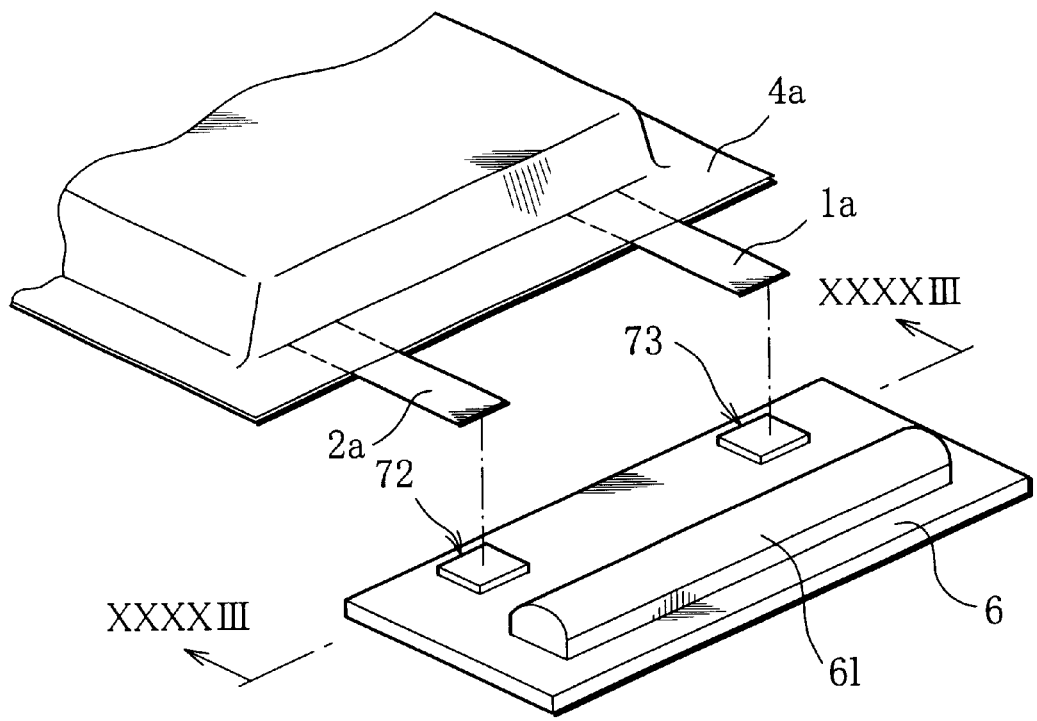
FIG. 42 is an exploded perspective view illustrating a portion of a battery pack according to an eighth embodiment of the present invention.
Figure 43:
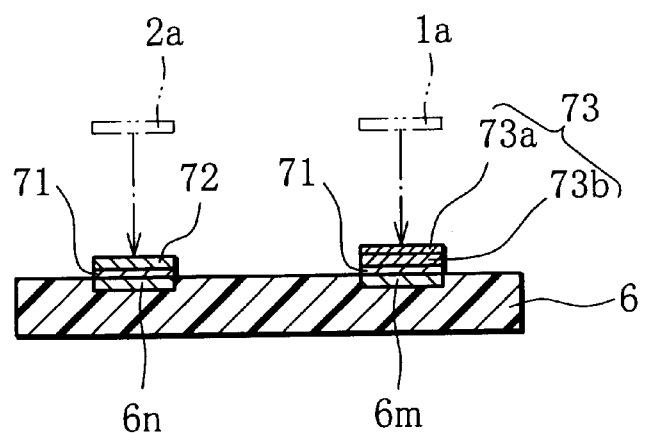
FIG. 43 is an enlarged cross-sectional view taken along the line XXXXIII—XXXXIII in FIG. 42.

In FIGS. 42 and 43, a negative land 6n, generally made of Cu, of a circuit board 6 is provided with an Ni piece 72 through a solder layer 71. A positive land 6m in turn is provided with a clad piece 73 through the solder layer 71.

The clad piece 73, which is formed by cladding an Al foil 73a over an Ni foil 73b, is placed on the solder layer 71 such that the Al foil 73a overlies.

Then, a positive tab 1a made of Al of a flat battery cell is superposed on the Al foil 73a of the clad piece 73, while a negative tab 2a made of Ni is superposed on the Ni piece 72. Then, spot welding such as a parallel low-resistance welding method, for example, is applied to each of them to form a connection structure.

With this connection structure, since the same kinds of materials are welded, their welding strength is larger as compared with a counterpart made by welding different kinds of materials, thus providing a larger connection strength.

It should be noted that since the positive tab 1a and the negative tab 2a both have a thickness of approximately 100 μm, welding is preferably performed at a large number of points because problems could arise in regard to the welding strength from an excessively small number of welding points, particularly in the welding of the positive tab and the clad piece 73. For example, while the negative tab and the Ni piece may be welded at two points, the positive tab and the clad piece are preferably welded at four or more points.

Then, when protection circuit parts 61 are mounted on the surface of the circuit board 6 by reflow processing using soldering, the clad piece 73 is carried on the positive land 6m through a solder layer, and the Ni piece 72 is carried on the positive land 6n through the solder layer in a similar manner. The clad piece 73 and the Ni piece 72 are preferably arranged on the circuit board 6 by performing the reflow processing in this state.

In this event, since the clad piece 73 and the Ni piece 72 are both bonded to the respective lands by soldering, they exhibit higher bonding strengths, thereby making it possible to form a connection structure with a high connection strength as a whole, in combination of the aforementioned realization of the higher welding strength. Also, since the protection circuit parts 61 are surface mounted simultaneously with the arrangement of the clad piece and the Ni piece on the circuit board 6, the circuit board 6 can be efficiently manufactured.

EXAMPLE

First, a flat battery cell including a positive tab made of Al and having a thickness of 100 μm and a width of 3 mm, and a negative tab made of Ni and having a thickness of 100 μm and a width of 100 mm was prepared.

Also, eutectic solder foils were placed on a positive land and a negative land, respectively, both of which were made of Cu and shaped in a rectangle of 4 mm long 3 mm wide. Further, on the eutectic solder foils, a clad piece (4 mm long 3 mm wide) composed of an Al foil of 150 μm thick and an Ni foil of 150 μm thick was placed for the positive land, with the Ni foil positioned below, and an Ni piece (4 mm long 3 mm wide) of 300 μm thick was placed for the negative land. Subsequently, reflow processing was performed over the entire structure at a temperature of 200° C. The resulting structure was cooled in a room temperature environment, resulting in the circuit board 6 illustrated in FIG. 43.

Next, the positive tab of the flat battery cell was superposed on the clad piece, while the negative tab of the flat battery cell was superposed on the Ni piece, followed by spot welding to form the connection structure. The positive tab was welded at four points, while the negative tab was welded at two points.

Subsequently, a destructive inspection was performed on the connection structure by pulling each of the positive tab and the negative tab at a rate of 5 mm/min. As a result, the connection structure was not broken even when the tensile strength reached 30 N, whereas the positive tab and the negative tab themselves were torn off.

For comparison, an Ni piece, identical to that used for the negative land, was placed on the positive land, instead of the clad piece, and the positive tab of the flat battery tab was spot welded in similar conditions to the embodiment to attempt the formation of a connection structure. However, no welding was possible.

In the following, a battery pack according to a ninth embodiment of the present invention will be described with reference to FIGS. 44 to 46.

The battery pack of this embodiment is characterized in that a resistive element is interposed between a positive tab or a negative tab of a flat battery cell and a circuit board. The resistive element is accommodated in a space 8 in the shape of terrace of the flat battery cell.

Figure 45:
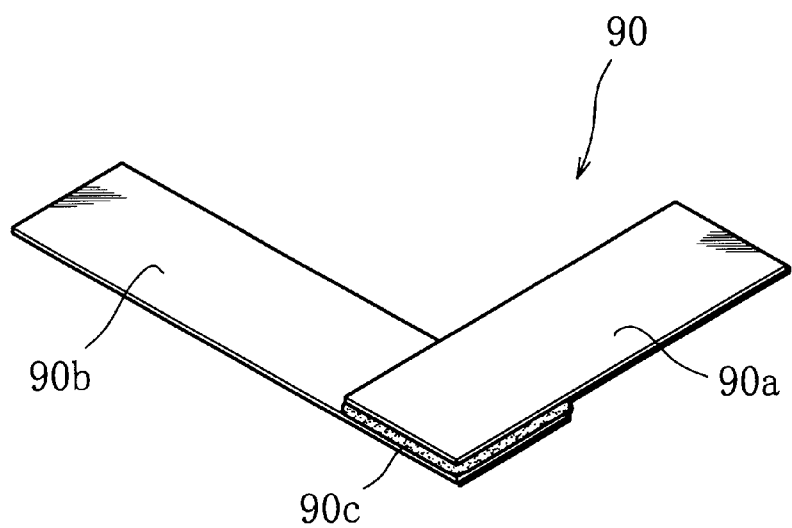
FIG. 45 is a perspective view of a resistive element illustrated in FIG. 44.

As illustrated in FIG. 45, this resistive element 90 comprises two metal foils 90a, 90b made, for example, of Ni, and a conductive polymer sheet 90c having a positive temperature coefficient, interposed between the two metal foils 90a, 90b. Generally, the polymer sheet 90c has a thickness in a range of 0.5 to 1.5 mm. In addition, the conductive polymer sheet 90c is formed of a polymer, which is an insulating material, dispersed with an electrically conductive material, for example, carbon grains, such that the conductive polymer sheet 90c exhibits a lower resistance in a normal state or at a room temperature by the action of conductive paths formed by the carbon grain.

However, as the temperature rises from the room temperature, thermal expansion of the polymer, which is an insulating material, gradually advances to cut the conductive paths, so that the conductive polymer sheet 90c exhibits a gradually increasing electric resistance. Stated another way, the conductive polymer sheet 90c has a positive temperature coefficient (PTC). Eventually, as a certain temperature is reached, the resistance suddenly increases to convert the conductive polymer sheet 90c to virtually an insulating material.

Then, as the temperature falls, the conductive polymer sheet 90c exhibits a behavior reverse to the foregoing and recovers to the original low resistance state in the normal state.

The flat battery cell of this embodiment is assembled using the resistive element 90 having the PTC characteristic mentioned above.

Figure 46:
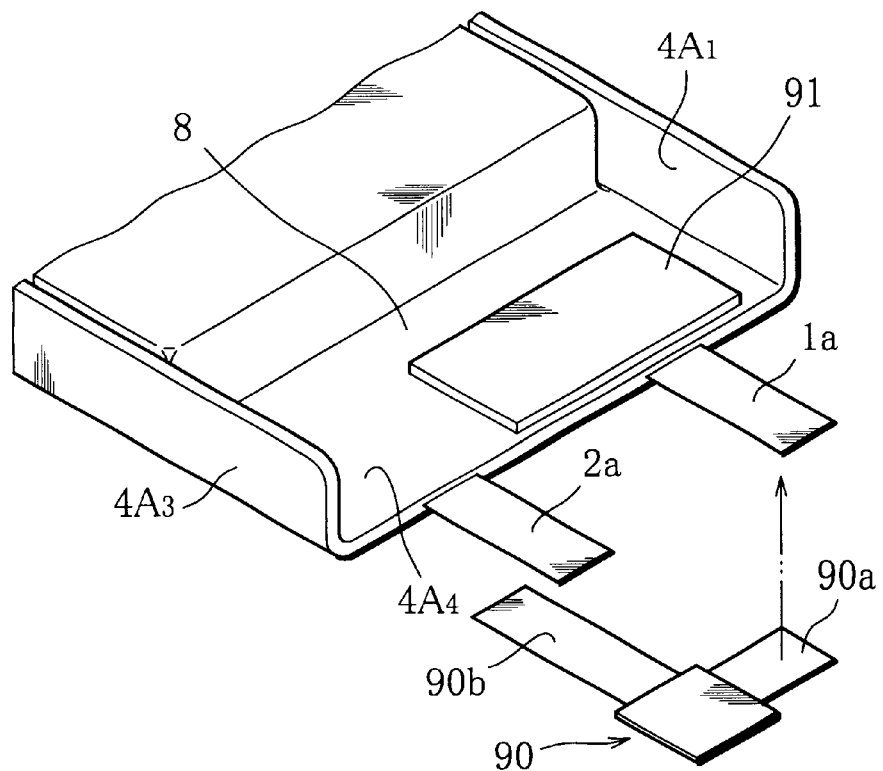
FIG. 46 is a partial perspective view for explaining how positive and negative tabs of a battery pack are connected to the resistive element.

In this event, used as the resistive element 90 is preferably such one that has metal foils 90a, 90b arranged orthogonal to each other and in a L-shape when seen in a plan view, as illustrated in FIGS. 45 and 46.

For assembling, an end portion of one metal foil 90a of the resistive element 90 is first brought into contact with the bottom surface of the aluminum positive tab 1a drawn out from a peripheral sealing $4A_4$ beside the terminals of the flat battery cell, as indicated by an arrow in FIG. 46. Then, they are connected. More specifically, the positive tab is superposed on the metal foil, and ultrasonic welding is performed to connect them.

Next, the positive tab 1a is bent toward the space 8. In this event, the space 8 is provided with a thermally insulating material 91.

By bending the positive tab 1a, the resistive element 90 is positioned on the insulating material 91 upside down, and accommodated in the space 8. Then, the other metal foil 90b of the resistive element 90 extends outwardly from the space 8 in parallel with the negative tab 2a.

Here, the thermally insulating material 91 is provided for preventing heat generated from the resistive element 90, which is heated during the operation of the battery pack, from transferring to the electric power generating element. For example, the thermally insulating material 91 may be a tape based on polyurethane resin, fiber paper or the like, and have a thickness in a range of approximately 0.5 to 2 mm.

The flat battery cell of this embodiment produces the following effects:

(1) Assume for example that an excessive current caused by external short-circuiting flows into the resistive element 90. The resistive element 90 is resistively heated to begin exhibiting the PTC characteristic, and is converted to virtually an insulating material when a certain temperature (for example 100° C.) is reached to perform an excessive current protection function by blocking the excessive current. Subsequently, as the temperature falls, the resistive element 90 again recovers to the low resistance element.

Stated another way, the PTC characteristic of the low resistance element enables the flat battery cell to have a permanent excessive current protection function rather than a temporary excessive current protection function.

(2) With this flat battery cell, since the resistive element of approximately 0.5 to 1.5 mm thick and the thermally insulating material 91 of 0.5 to 2 mm thick are accommodated within the space 8 of 3 to 5 mm high, an excessive current protection function is provided without sacrificing the thickness of the overall flat battery cell.

Figure 44:
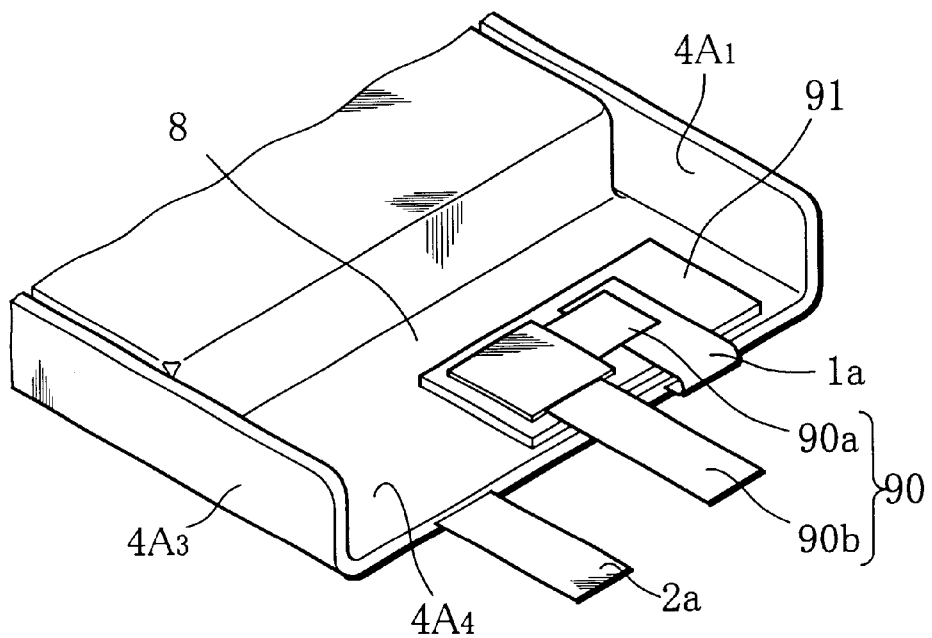
FIG. 44 is a perspective view illustrating a portion of a battery pack according to a ninth embodiment of the present invention.

(3) Since the metal foils 90a, 90b of the resistive element are generally made of Ni, the flat battery assembled as illustrated in FIG. 44 has output terminals, all of which are made of Ni. For this reason, connection of the flat battery cell with other circuit parts is facilitated.

In the following, a battery pack according to a tenth embodiment of the present invention will be described with reference to FIGS. 47 to 49.

Figure 47:
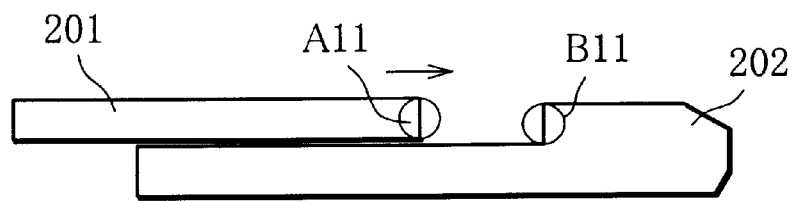
FIG. 47 is a schematic side view illustrating a battery pack according to a tenth embodiment of the present invention together with an electronic device.

As illustrated in FIG. 47, the battery pack 202 of this embodiment is mounted to an electronic device 202 for practical use. The battery pack 201 is formed with a terminal set A11, while the electronic device 202 is formed with a terminal set B11 which can be connected to the terminals A11. The terminal sets A11, B11 are mechanically engaged and integrated as the battery pack 201 is mounted to the electronic device 202.

Therefore, even if an external force is applied entirely to the battery pack 201 and the electronic device 202 to cause deformation such as deflection, the integrated terminal sets A11, B11 through firm engagement, are free from failed contact which would otherwise be experienced by flat plate terminals.

Figure 48:
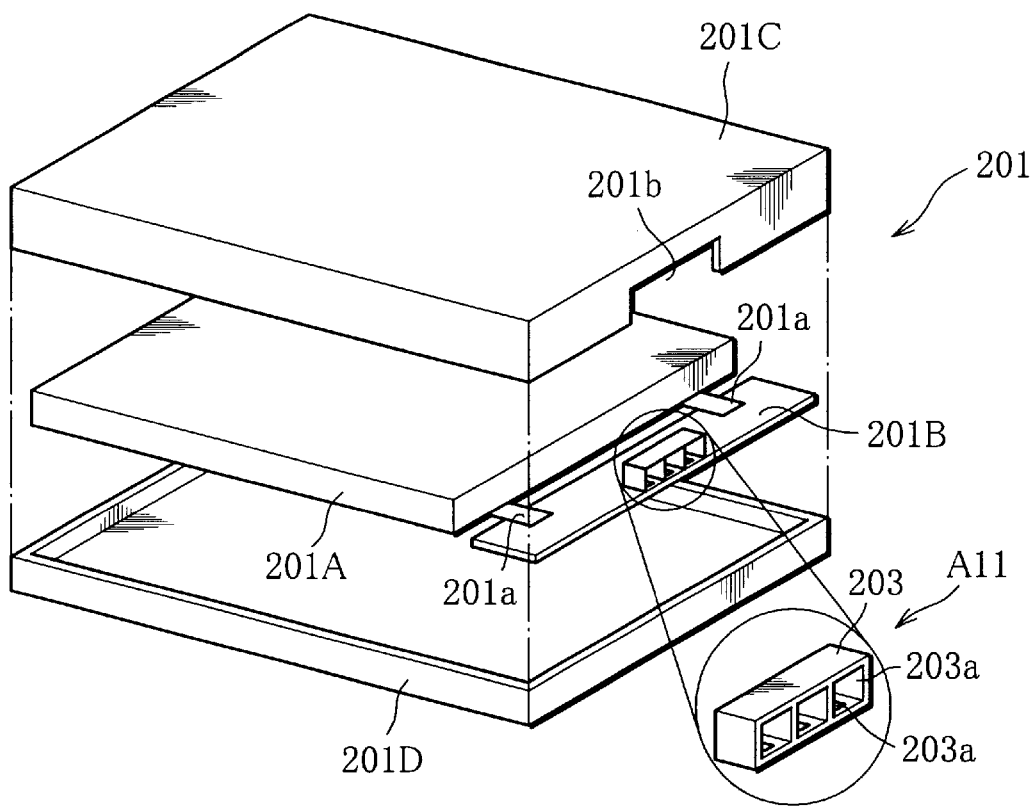
FIG. 48 is an exploded perspective view of the battery pack illustrated in FIG. 47.

As illustrated in FIG. 48, the battery pack 201 comprises a flat battery cell 201A such as a film cell; a circuit board 201B connected to positive and negative leads 201a of the flat battery cell 201A; and a container composed of an upper case 201C and a lower case 201D. The circuit board 201B is provided with the terminal set A11, while the upper case 201C is formed with an indentation 201b in a side wall, substantially conformal with the outer shape of the terminal set A11.

Thus, the front surface of the terminal set A11 is only exposed from the one side surface of the battery pack 201.

The terminal set A11 comprises a resin molding 203 entirely made of an electrically insulating resin and having three insertion holes 203a in the shape of quadrangle; and terminals 203b made, for example, of copper, and molded in the molding 203 such that they are exposed within the insertion holes 203a for connection with predetermined terminals (not shown) of the circuit boards 201B.

Figure 49:
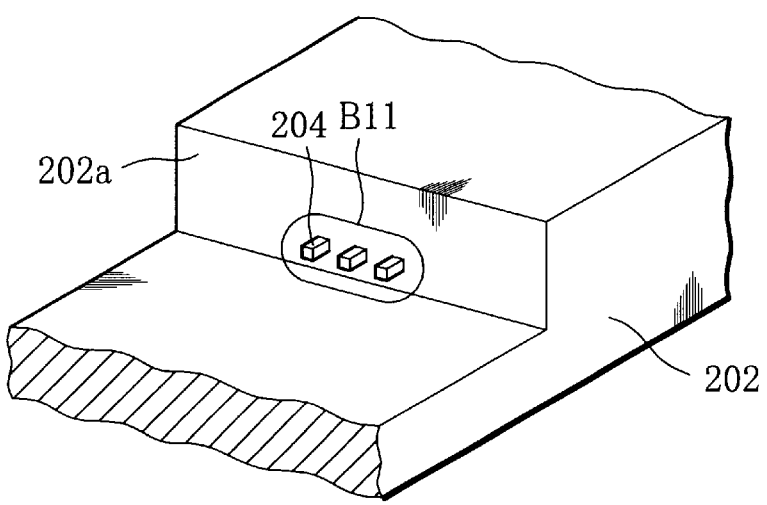
FIG. 49 is a partial perspective view illustrating terminals of the electronic device illustrated in FIG. 47.

The electronic device 202, in turn, is provided with three protruding terminals 204 at positions corresponding to the terminal set A11 to form the terminal set B11 on the electronic device side, as can be seen in FIG. 49. Here, the terminals 204 have a cross-sectional shape similar to but slightly larger than that of the insertion holes 203a.

As the battery pack 201 is slid on the electronic device 202 for mounting thereto as illustrated in FIG. 47, the terminals 204 protruding from the surface 202a of the electronic device 202 are inserted into the insertion holes 203a of the terminal set A11. Since the insertion holes 203a are slightly smaller than the terminals 204, the insertion holes 203a are slightly expanded. In this event, the resilient resin molding 203 allows the terminals 204 to press fit into the insertion holes 203a, resulting in integration of the battery pack 201 with the electronic device 202 through firm engagement of the terminal set A11 with the terminal set B11. Then, the terminals 203b in the insertion holes 203a reliably come in face contact with the terminals 204. Even if the battery pack and/or the electronic device suffer from deformation, the integrated structure with the firmly engaged terminal sets will not be affected by the deformation, and ensures the face contact of the terminals on both sides.

In this integrated structure, the insertion holes 203a of the terminal set A11 are not necessarily rectangular but may be circular. With circular insertion holes, the terminals 204 in the terminal set B11 should be formed in cylinder. Also, the terminals 203b in the terminal set A11 are not necessarily formed in flat plates fixed on the inner walls of the insertion holes 203a, as illustrated, but may be formed in tube as a whole. The tubular terminals 203b would hold the terminals 204 with the entire inner face of the insertion hole 203a, so that failed contact is less likely to occur.

Figure 50:
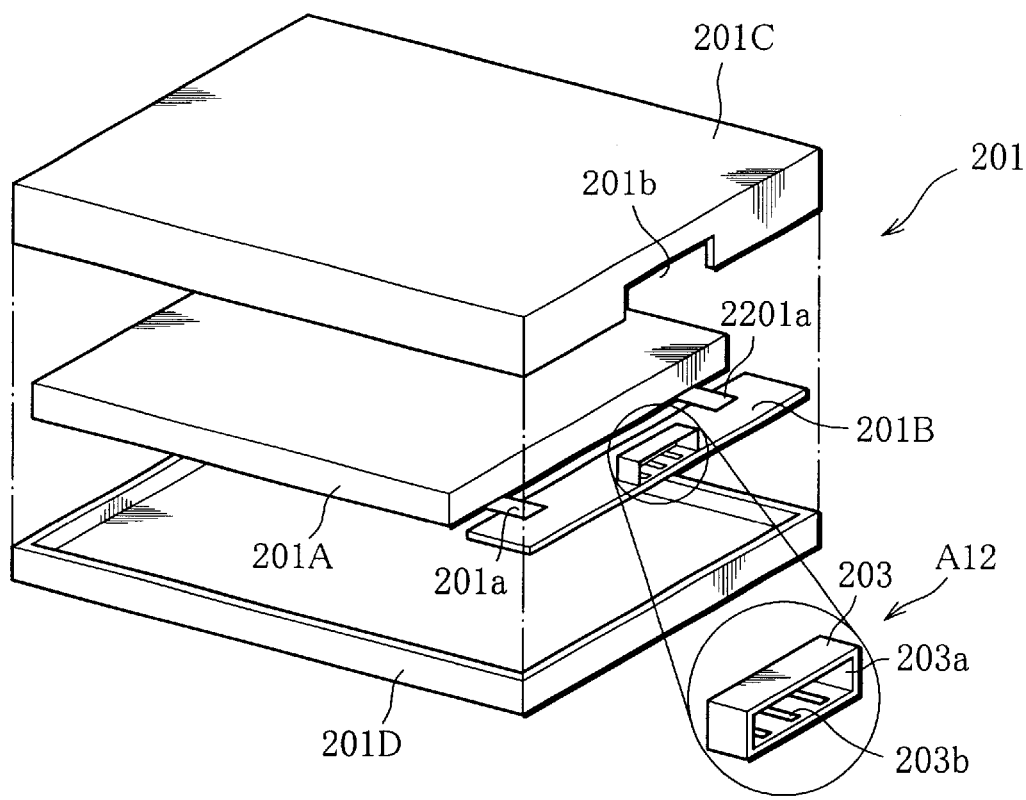
FIG. 50 is an exploded perspective view of a battery pack according to an eleventh embodiment of the present invention.

FIG. 50 illustrates a battery pack according to an eleventh embodiment of the present invention which has a terminal set A12 having a structure different from that of the terminal sets A11 illustrated in FIG. 48.

The terminal set A12 comprises a resin molding 203 generally in the shape of box which is open on one side; and terminals 203b fixed on the bottom wall of the molding 203 by molding. The terminal set A12 is mounted at a predetermined position on the top surface of a circuit board 201B.

An upper case 201C is formed with an indentation 201b in one side wall, substantially conformal with the outer shape of the terminal set A12.

Figure 51:
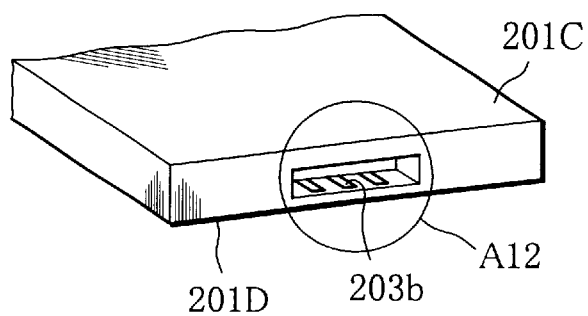
FIG. 51 is a partial perspective view illustrating terminals of the battery pack shown in FIG. 50.

Thus, as illustrated in FIG. 51, the front surface of the terminal set A12 exists on one side of the battery pack as a recess in which the terminals 203b are exposed.

Figure 52:
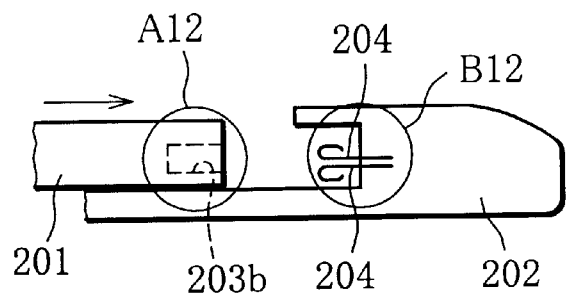
FIG. 52 is a partial side view for generally explaining how terminals of the battery pack illustrated in FIG. 50 are connected to terminals of an electronic device.

A terminal set B12 of an electronic device, adapted to engage with the terminal set A12, includes a pair of terminals 204 arranged one above the other with a predetermined spacing therebetween, as illustrated in FIG. 52. The vertical spacing between the pair of terminals is slightly smaller than the thickness of a part of a lower case 201D which defines the terminal set A12.

As the battery pack 201 is mounted to the electronic device 202, the part of the lower case in the terminal set A12 of the battery pack is sandwiched between the pair of terminals 204. The resiliency of the pair of terminals 204 causes the terminals 203b of the terminal set A12 to come into pressure contact with the upper terminals 204 of the terminal set B12, resulting in the integration of the battery pack 201 with the electronic device 202 through mutual engagements of the terminal sets A12, B12

Figure 53:
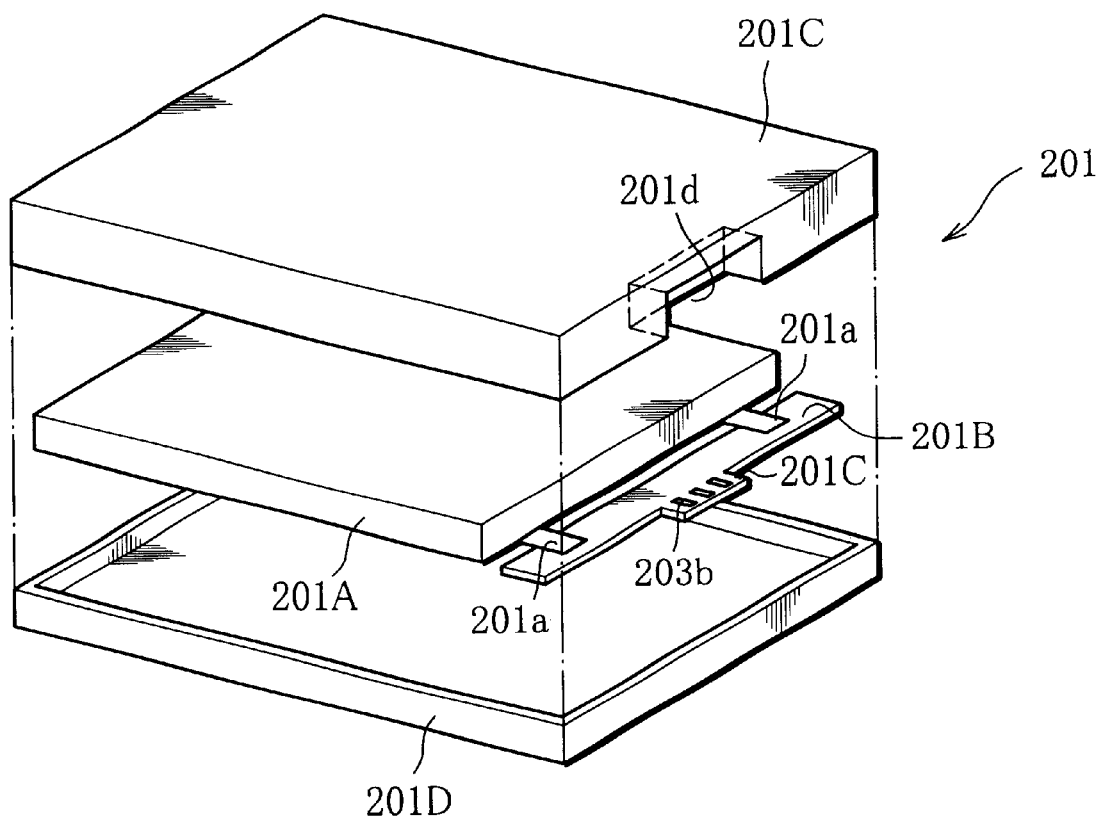
FIG. 53 is an exploded perspective view of a battery pack according to a twelfth embodiment of the present invention.

FIG. 53 illustrates a battery pack according to a twelfth embodiment of the present invention.

In this battery pack, a circuit board 201B has a protrusion 201c in a central region thereof, on which terminals 203b are formed. An upper case 201C is formed with an indentation 201d in one side wall which is shaped to cover the back and sides of the protrusion 201c.

Thus, as component parts are assembled into the battery pack, the resulting battery pack has a terminal set having a structure similar to that of the terminal set A12 illustrated in FIG. 51. As will be appreciated, the battery pack of this embodiment can also form an integrated structure with an electronic device having the terminal set B12 as illustrated in FIG. 52, when the battery pack is mounted to the electronic device.

Figure 54:
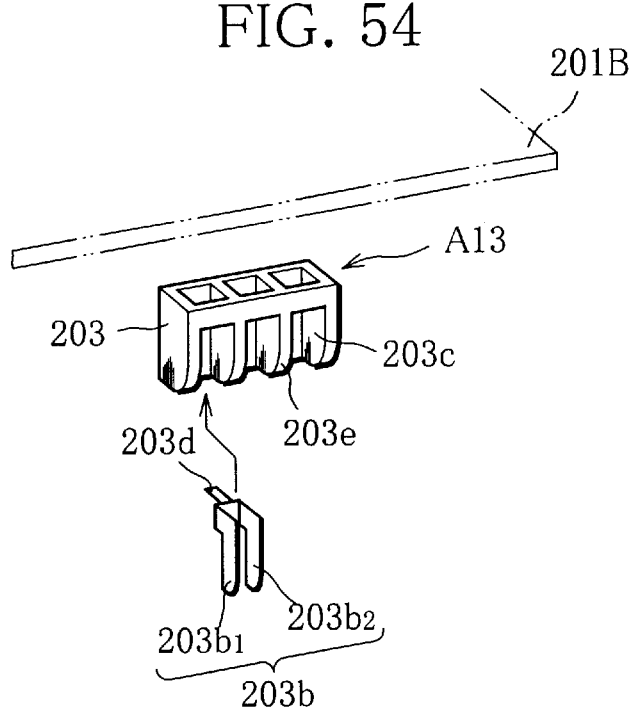
FIG. 54 is an exploded perspective view illustrating terminals of a battery pack according to a thirteenth embodiment of the present invention.

FIG. 54 illustrates a terminal set A13 formed in a battery pack according to a thirteenth embodiment of the present invention.

The terminal set A13 is composed of a resin molding 203 which has three slits 203c, each of which is open on front, bottom and top faces; and terminals 203b arranged in these slits 203c. The terminal set A13 is mounted on the bottom surface of a circuit board 201B.

Each of the terminals 203b is structured as a spring which has two terminal pieces $203b_1$, $203b_2$ branched from a leading end piece 203d and opposing each other. The terminal 203b is inserted into the slit 203c as indicated by an arrow in FIG. 54, such that the leading end piece 203d is positioned over the upper opening of the resin molding 203 for connection to a terminal (not shown) of the circuit board 201B, while the two terminal pieces $203b_1$, $203b_2$ are fixed in the slits by their spring pressures causing them to come into pressure contact with partition walls 203e which define the slits therebetween.

Figure 55:
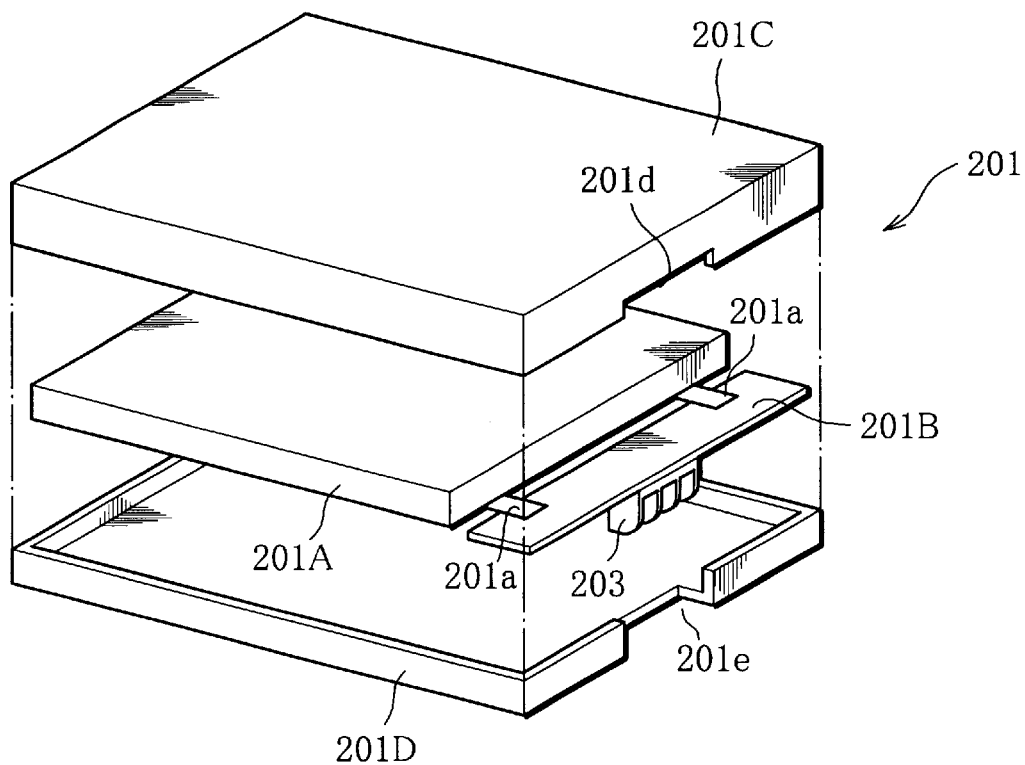
FIG. 55 is an exploded perspective view of a battery pack which has the terminals illustrated in FIG. 54.

Then, the resin molding 203, mounted on the bottom surface of the circuit board 201B as illustrated in FIG. 55, is arranged in the lower case 201D which is formed with an indentation 201e so as to expose the bottom of the resin molding 203. Further, an upper case 201C formed with an indentation 201d in a corresponding region is placed on the lower case 201D to complete the battery pack.

Figure 56:
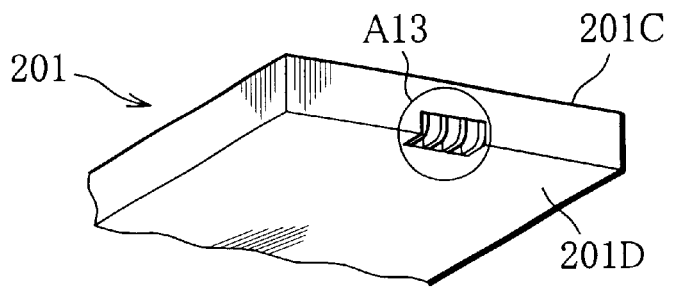
FIG. 56 is a partial perspective view of terminals of the battery pack illustrated in FIG. 55.

Thus, the assembled battery pack, as illustrated in FIG. 56, is formed with the terminal set A13 which has a front portion of the resin molding 203 exposed from the indentation of the upper case 201C of the battery pack, and a lower portion of the resin molding 203 exposed from the indentation formed through the back of the lower case 201D.

Figure 57:
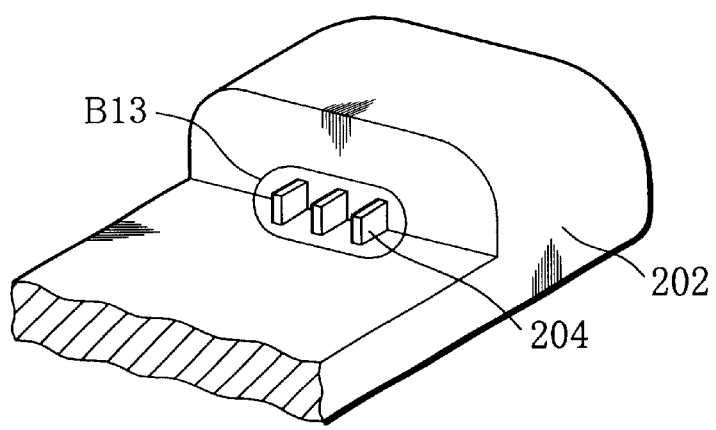
FIG. 57 is a partial perspective view illustrating terminals of an electronic device to which the battery pack having the terminals shown in FIG. 56 is mounted.

As illustrated in FIG. 57, a terminal set B13 of an electronic device, adapted to engage with the terminal set A13, comprises plate-like terminals 204 formed as protruding from a surface opposing the terminal pieces 203b of the terminal set A13. Each of the terminals 204 has a thickness slightly larger than the spacing between the terminal pieces $203b_1$, $203b_2$.

As the battery pack 201 is mounted to the electronic device 202, each terminal 204 is inserted into the terminal pieces $203b_1$, $203b_2$ in a corresponding slit of the terminal set A13, wherein the terminal 204 is sandwiched by the resilient partition walls 203e of the resin molding 203, thereby forming an integrated structure of the battery pack 201 with the electronic device 202 through the engagement of the terminals 204 with the pairs of terminal pieces $203b_1$, $203b_2$.

Figure 58:
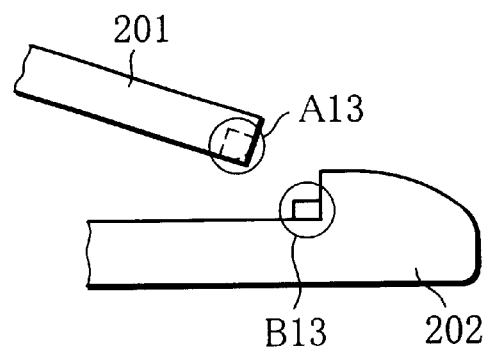
FIG. 58 is a partial side view for generally explaining how the battery pack illustrated in FIG. 56 is mounted to the electronic device illustrated in FIG. 57.

It should be noted that since the terminal set A13 also has the slits in the lower case, the battery pack 201 may be mounted to the electronic device 202 from the above at an angle to engage the terminals 204 into the slits, as illustrated in FIG. 58.

Figure 59:
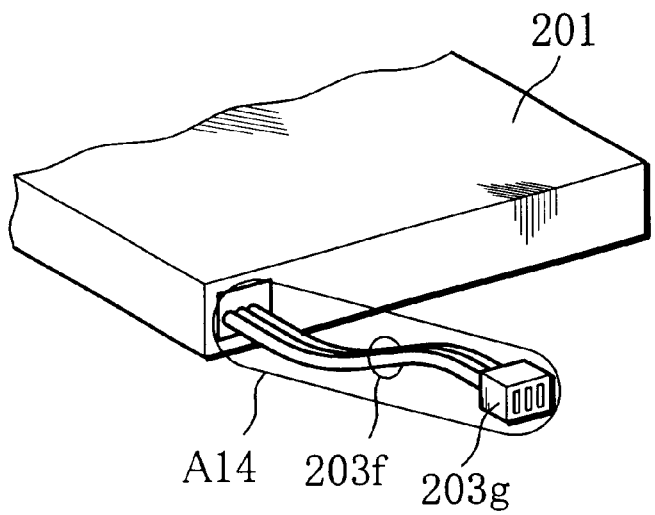
FIG. 59 is a partial perspective view illustrating a portion of a battery pack according to a fourteenth embodiment of the present invention.

FIG. 59 illustrates a battery pack according to a fourteenth embodiment of the present invention.

The illustrated battery pack 201 has a terminal set A14 which has a lead line 203f drawn from the battery pack 201, and a resin molded connector 203g integrally formed with terminals (not shown) therein and connected to the leading end of the lead line 203f. An electronic device in turn is formed with a terminal for engagement with the connector 203g, such that the battery pack and the electronic device are assembled into an integrated structure by fitting the terminal into the connector 203g.

While the battery packs according to the tenth to fourteenth embodiments all employ a one-line terminal set, the terminal set in the present invention is not limited to such a particular configuration. Alternatively, the battery pack of the present invention may employ a terminal set formed with upper and lower insertion holes in two lines.

In the following, a battery pack according to a fifteenth embodiment of the present invention will be described with reference to FIGS. 60 to 62.

Figure 60:
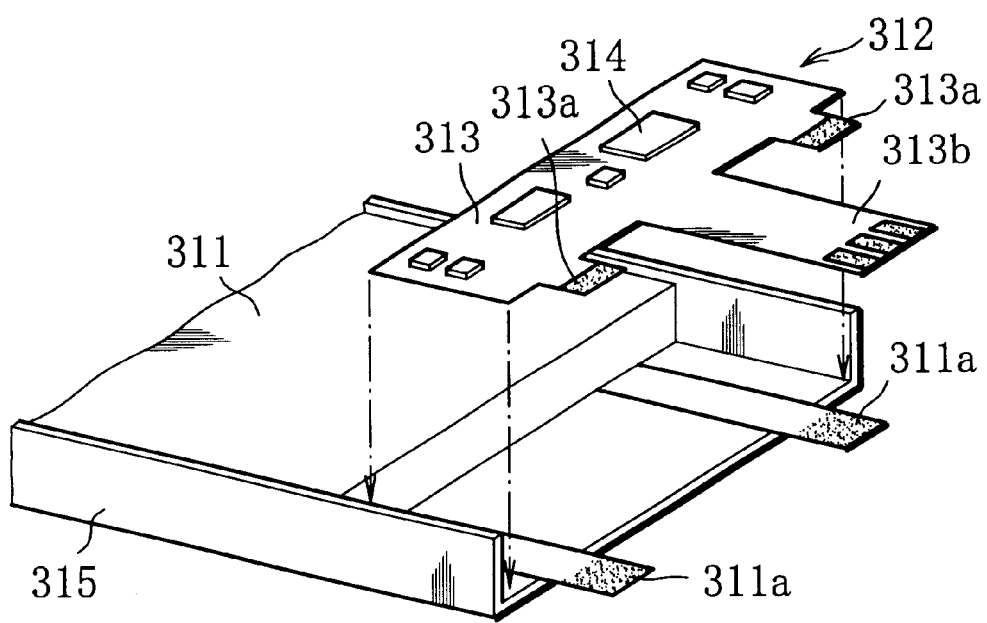
FIG. 60 is a partial exploded perspective view illustrating a portion of a battery pack according to a fifteenth embodiment of the present invention.
Figure 61:
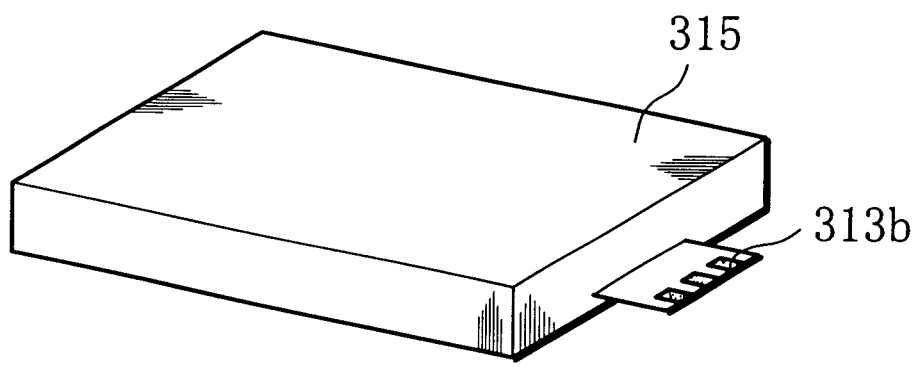
FIG. 61 is a general perspective view of the battery pack illustrated in FIG. 60.

First in FIG. 60, reference numeral 311 designates a flat battery cell, an Li ion battery cell or the like, and 312 designates a protection circuit for the battery cell. The protection circuit 312 includes a plurality of electronic parts 314 mounted on a flexible circuit board 313 commonly referred to as a "flexible printed wiring board." The flexible circuit board 313 is provided with tabs 313a which are connected to positive and negative lead tabs 311a drawn from the battery cell 311 by welding or the like. Further, a portion of the flexible circuit board 313 is formed as an extension 313b which is drawn from the battery cell 311 to the outside to form an external connection terminal.

Thus, the flexible circuit board 313 formed with the extension 313b as mentioned and mounted with the protection circuit 312 is integrally assembled into a flat box-like container 315, which constitutes the battery pack, together with the battery cell 311. The extension 313b, forming the external connection terminal, is drawn to the outside from one end of the container 315 in parallel with a main surface of the container 315 as illustrated in FIG. 61 such that an end portion of the extension 313b functions as connection terminals which are sandwiched by a connector, later described, from both sides.

Specifically, the battery pack according to this embodiment uses the extension 313b forming part of the flexible circuit board 313, which is drawn from the case 315 to the outside, as the external connection terminals. As illustrated in FIG. 62, the extension 313b is sandwiched by a connector 316 provided in an electronic device from both sides to make electric connection between the battery pack and the electronic device.

Figure 62:
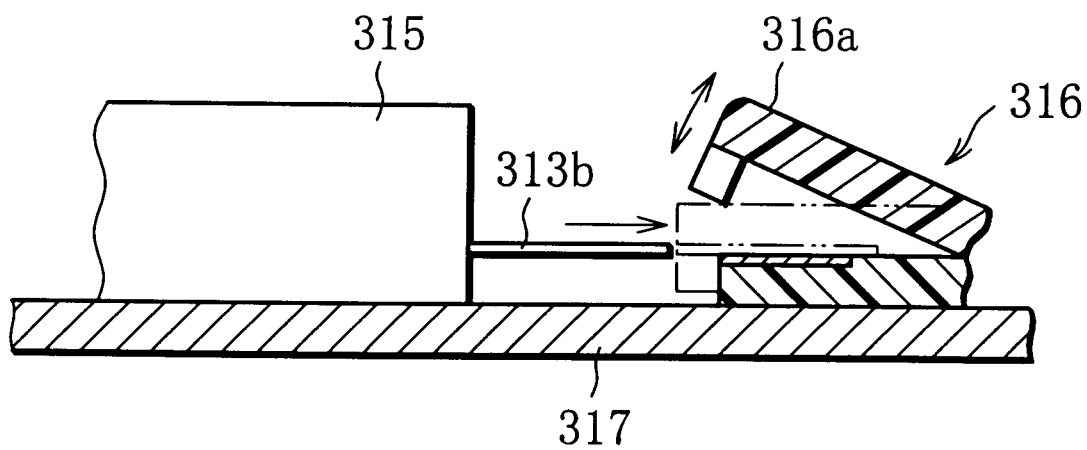
FIG. 62 is a partially sectioned partial side view for explaining how the battery pack illustrated in FIG. 61 is electrically connected to an electronic device.

In FIG. 62, reference numeral 317 designates a printed circuit board on the electronic device side, on which the connector 316 of the electronic device is attached. The connector 316 may be such one that has, for example, sandwiching members 316a which are opened and closed to sandwich the extension 313b of the flexible circuit board 313 therebetween, as can be seen in FIG. 62. Alternatively, the connector 316 may be of such a structure that has a slit-like groove into which the extension 313b can be inserted, and contact members made of resilient pieces arranged internally to sandwich the inserted extension 313b from both sides to make electric connection between the battery pack and the electronic device.

Consequently, according to the battery pack configured as described above, since the extension 313b of the flexible circuit board 313 is used as external connection terminals for connection with an electronic device, terminal plates need not be assembled into the battery pack, as has been required in the prior art, thereby making it possible to reduce the number of components of the battery pack. Further, the extension 313b, functioning as the external connection terminals, is resistant to bending since it is a portion of the flexible circuit board 313, and is also relatively freely bendable. Thus, although the extension 313b protrudes from the container 315, it is relatively less susceptible to damages or the like due to an external force applied thereto. For reference, when a conventional printed circuit board made of glass epoxy resin is protruded to the outside of the container 315, a problem arises in that the printed circuit board is highly susceptible to damages such as fracture due to an external force applied thereto.

It is also possible to make electric contact of the extension 313b with the connector 316 of the electronic device by bending the flexible extension 313b in line with the position of the connector 316, thereby making it possible to readily and reliably make connection with the electronic device. Furthermore, since the extension 313b can also be inserted into a slit-like groove of the connector 316, the battery pack of this embodiment is advantageous in that it facilitates the connection of the extension 313b to the connector 316, which is involved in mounting of the battery pack to the electronic device.

From a viewpoint of the electronic device, since the connector 316 need not be superposed on the battery pack, as has been required in the prior art, and the connector 316 is only required to be arranged beside the battery pack, it is convenient to intend a reduction in thickness. Moreover, even if a battery-pack mount of the electronic device is largely open in a manner permitting the battery pack to be mounted thereon and removed therefrom in the direction of the main surface of the battery pack, the bendable nature of the extension 313b can be utilized to make electric connection while the battery pack is mounted to the electronic device. Thus, the battery pack of this embodiment is advantageous in that the direction in which the electric connection is made to the connector 316 need not be coincident with the directions in which the battery pack is mounted and removed.

The foregoing embodiment has been described as illustrative for the structure in which the extension 313b of the flexible circuit board 313 is drawn to the outside of the container 315 as external connection terminals for making electric connection with an electronic device. On the contrary, the electronic device may be provided with a connection terminal forming part of a flexible circuit board for making electric connection with the battery pack. In this case, the flexible circuit board 313 of the battery pack may be provided with a connector for sandwiching the connection terminal formed in the flexible circuit board, drawn from the electronic device, from both sides to make the electric connection.

In this way, even when the connection terminal is formed in the flexible circuit board of the electronic device and the connector is provided in the battery pack, the electric connection between the battery pack and the electronic device can be made through the flexible circuit. In this arrangement, since the battery pack can employ a thin connector which is only required to sandwich the flexible board, the battery pack will not be increased in thickness. Further, the battery pack has no extension protruding from the flexible circuit board, so that it can be more easily handled.

It will be understood that the battery pack of this embodiment can be modified in various ways. For example, the size, capacity and so on of the battery cell may be varied in accordance with its specification. The protection circuit may provide a remaining energy monitoring function and so on as well as the excessive charging protection, excessive discharging protection and so on. The external connection terminal may only include at least positive and negative electrodes of the battery cell. Furthermore, the connector for sandwiching the extension serving as the external connection terminal is not particularly limited in structure.

The present invention is not limited to the battery packs shown in the foregoing first to fifteenth embodiments, but may be modified in various ways. For example, features of the battery packs in the respective embodiments may be used in combination.

Although the first to fifteenth embodiments each comprise a film type flat battery cell including an electric power generating element comprised of positive and negative electrodes and an electrolyte disposed therebetween, a film type flat battery cell of this invention may include, for example, an electric power generating element obtained by forming a spiral laminator into a flat shape. The spiral laminator is obtained by spirally wounding a laminator comprised of positive and negative electrodes and a separator interposed therebetween. The construction and configuration of the electric power generating element may vary according to the specifications of the battery cell.

What is claimed is:

1. A battery pack (10, 10', 20, 30, 40, 50) comprising:
    a flat battery cell (B1, B2) including a flat electric power generating element (A), at least one armor material (4) for sealing said flat battery cell, and a positive tab (1a) and a negative tab(2a) extending from said electric power generating element to the outside of the armor material through sealings ($4A_1$, $4A_2$, $4A_3$, $4A_4$) of said armor material;
    a circuit board (6) connected to said positive tab and said negative tab; and
    a container (16, 26, 36, 46, 56) having two main walls (12a, 14a; 12', 14a; 22a, 24a; 32a, 34a; 42a, 44a; 52a, 54a) extending along two main surfaces of said flat battery cell,
    wherein at least a portion of said circuit board is positioned in a space (8, 8') defined by the sealing ($4A_4$) of said armor material beside said circuit board and an inner surface of said container, and at least one of the two main walls of said container is at least partially formed of a metal plate.

2. The battery pack (10, 30, 40, 50) according to claim 1, wherein said container (16, 36, 46, 56) comprises two case halves (12, 14; 32, 34; 42, 44; 52, 54); and
    each of said case halves includes a main wall (12a, 14a; 32a, 34a; 42a, 44a; 52a, 54a) at least partially made of a metal plate.

3. The battery pack (10, 30, 40, 50) according to claim 2, wherein each of said case halves includes a metal plate (12a, 14a; 32a, 34a; 42a, 44a; 52a, 54a) constituting the main wall, and a frame (12b, 14b; 32b, 34b; 42b, 44b; 52b, 54b) made of resin and attached to the metal plate, both said case halves being integrated with each other through said frames.

4. The battery pack according to claim 3, wherein said metal plate (12a, 14a) constituting the main wall of each said case half is insert molded into said frame (12b, 14b) of the case half associated therewith.

5. The battery pack (30, 40) according to claim 2, wherein one of said case halves (34) includes a metal plate (34a, 44a) constituting the main wall and a frame (34b, 44b) made of resin attached to said metal plate, and another case half only includes a metal plate (32, 42) having a side wall (32b, 42b) thereof fitted into the frame (34b, 42b) of said one of the case halves.

6. The battery pack (40) according to claim 5, wherein said side wall (42b) of the metal plate is formed with a stopper (42s), and said frame (44b) is formed with a recess (44c) into which the stopper can be inserted, the stopper being extendable in the recess of the frame to prevent the metal plate from coming off from the frame.

7. The battery pack (10', 20) according to claim 1, wherein said container (26) comprises two case halves (12', 14; 22, 24);
    one case half (12', 22) comprises a frame made of resin; and
    another case half (14, 24) has a main wall thereof at least partially made of a metal plate (14a, 24a).

8. The battery pack (10', 20) according to claim 7, wherein said another case half (14, 24) includes a metal plate (14a, 24a) constituting the main wall and a frame (14b, 24b) made of resin and attached to the metal plate; and
    said one case half (12', 22) is attached to the frame of said another case half.

9. The battery pack (10') according to claim 8, wherein said metal plate (14a) constituting the main wall of said another case half (14) is insert molded into the frame (14b) of said another case half.

10. The battery pack (10') according to claim 7, wherein said one case half (12') is provided at its surface with a label (37') made of metal.

11. The battery pack (10, 10', 20, 30, 40, 50) according to claim 3, 4 or 7, wherein said frame (12b, 14b; 12', 22; 32b, 34b; 42b, 44b; 52b, 54b) is made of a resin composition composed of a thermoplastic resin and a glass component.

12. The battery pack (10, 10', 20, 30, 40, 50) according to claim 11, wherein the thermoplastic resin is polycarbonate or liquid crystal polymer or a compound of polycarbonate and acrylic butadiene styrene resin, and the glass component is chopped glass fiber or glass beads.

13. The battery pack (10, 10', 20, 30, 40, 50) according to claim 12, wherein a percentage of the glass component is in a range of 10 to 25 volume %.

14. The battery pack (10) according to claim 3, wherein said frame (14b) of said one case half (14) forms an insulating region (14i) extending over an inner surface of the metal plate (14a) constituting the main wall of said one case half (14).

15. The battery pack (20) according to claim 8, wherein said frame (24b) of said another case half (24) forms an insulating region (24i) extending over an inner surface of the metal plate (24a) constituting the main wall of said another case half.

16. The battery pack (10, 30, 40) according to claim 3, wherein either one (14, 34, 44) of said two case halves is provided with connection terminals (6c) for connection of said circuit board (6) to an electronic device, said connection terminals being exposed on an outer surface of the case half.

17. The battery pack (10, 30, 40) according to claim 16, wherein said connection terminals (6c) are exposed on the outer surface of the frame (14b, 34b, 44b) of the case half (14, 34, 44) provided with these connection terminals, through openings (14d, 34d, 44d) formed in the frame of this case half.

18. The battery pack (10', 20) according to claim 8, wherein said another case half (14, 24) is provided with connection terminals (6c) for connection of said circuit board (6) to an electronic device, said connection terminal being exposed on an outer surface of said another case half.

19. The battery pack (10', 20) according to claim 18, wherein said connection terminals (6c) are exposed on the outer surface of the frame (14b, 24b) of the case half (14, 24) provided with these connection terminals, through openings (14d, 24d) formed through the frame of this case half.

20. The battery pack (10) according to claim 1, wherein connections of said positive and negative tabs (1a, 2a) to the terminals (6f) of said circuit board (6) are positioned within said space (8').

21. The battery pack according to claim 1, wherein a pair of lands (6m, 6n) are formed on said circuit board (6), said pair of lands being connected directly with said positive and negative tabs (1a, 2a).

22. The battery pack according to claim 21, wherein:
said circuit board (6) are mounted with protection circuit parts (61);
said positive tab (1a) is made of Al, and said negative tab (2b) is made of Ni;
said positive and negative tabs are welded to the pair of lands formed on said circuit board; and
said pair of lands are comprised of a positive land (6m) to which a Ni surface of an Al/Ni clad piece is soldered and a negative land (6n) to which a Ni piece is soldered.

23. The battery pack according to claim 22, wherein the soldering is performed simultaneously with reflow processing upon surface mounting the protection circuit parts (61) on said circuit board.

24. The battery pack (40) according to claim 3, wherein said metal plate (44a) constituting said main wall of at least one (44) of said two case halves is formed with a plurality of ribs (44r) or openings.

25. The battery pack (20) according to claim 7, wherein said one case half (22) forms part of an outer wall of an electronic device (80) to which said battery pack is mounted.

26. The battery pack according to claim 1, 2 or 7, wherein said battery pack is arranged to be mounted to an electronic device (202) having a terminal set (B11, B12, B13);
said battery pack includes a terminal set (A11, A12, A13) mounted on said container (201) oppose to and connectable to the terminal set of the electronic device; and
said terminal set (A11, A12, A13) of said battery pack includes a resin molding (203) mounted to said container (201), and terminals (203b) exposed in the resin molding and connected to said circuit board (6), said terminal set being firmly engaged with the terminal set (B11, B12, B13) of the electronic device when said battery pack is mounted to the electronic device.

27. The battery pack according to claim 26, wherein said terminal set (A11) of said battery pack includes a plurality of insertion holes (203a) formed in the resin molding (203) and a plurality of terminals (203b) accommodated in the insertion holes; and
said terminal set (B11) of the electronic device includes a plurality of terminals (204) press fitted into the insertion holes (203a) formed in the resin molding of the terminal set of said battery pack.

28. The battery pack according to claim 26, wherein said terminal set (A13) of said battery pack includes a plurality of slits (203c) formed in the resin molding (203) and a plurality of terminals (203b) accommodated in the slits;
each of the terminals (203b) of the terminal set of said battery pack includes a leading end piece (203d) connected to said circuit board and two terminal pieces ($203b_1$, $203b_2$) integral with said leading end piece, said two terminal pieces being in pressure contact with two mutually opposing slit-defining surfaces (203e) of the resin molding with a spring force of the two terminal pieces;
said terminal set (B13) of the electronic device includes a plurality of terminals (204) each of which is press fitted in between the two terminal pieces ($203b_1$, $203b_2$) of a corresponding one of the plurality of terminals of said terminal set of said battery pack.

29. The battery pack according to claim 1, 2 or 7, wherein said electric power generating element (A) of said flat battery cell is sealed by at least one armor material (4);
said armor material is sealed along at least three peripheral sides including first and second peripheral sides ($4A_1$, $4A_3$) respectively extending along two side edges of said electric power generating element and a third peripheral side ($4A_4$) extending along an end edge of said electric power generating element beside said circuit board;
the first and second peripheral sides of the armor material are bent along the side edges of said electric power generating element in a thickness direction of said flat battery cell; and
a width dimension of a portion of the first and second peripheral sides beside said circuit board is smaller than a width dimension of the remaining portion of the first and second peripheral sides, such that a height dimension of said portion of the two peripheral sides beside said circuit board becomes small when the first and second peripheral sides are bent.

30. The battery pack according to claim 29, wherein said electric power generating element (A) of said flat battery cell is sealed by a single armor material (4) folded in two; and
said armor material is sealed on said first, second and third peripheral sides ($4A_1$, $4A_3$, $4A_4$).

31. The battery pack according to claim 1, 2 or 7, wherein said circuit board (313) is flexible, and includes an extension (313b) extending outwardly from said container (315), said extension serving as an external connection terminal for use in electric connection of said battery pack to an electronic device to which said battery pack is mounted.

32. The battery pack according to claim 31, wherein circuit parts (314) constituting a protection circuit for said flat battery cell are mounted on said circuit board (313); and
said circuit board includes tabs (313a) connected to said positive and negative tabs (311a) of said flat battery cell.

33. The battery pack according to claim 31, wherein said container (315) is formed in the shape of flat box; and
said extension (313b) of said circuit board extends from said container (315) in parallel with the main wall of said container.

34. The battery pack according to claim 33, wherein said extension (313b) of said circuit board is sandwiched by a connector (316) of the electronic device to which said battery pack is mounted.

35. The battery pack according to claim 1, 2 or 7, further including:
- a resistive element (90) having a positive temperature coefficient and arranged on a sealing (4A$_4$), on a side of said circuit board, of said armor material through a thermally insulating material (91), said resistive element having one end portion thereof connected to one of said positive tab (1*a*) and said negative tab (2*a*).

36. The battery pack according to claim 35, wherein said resistive element (90) includes a pair of metal foils (90*a,* and 90*b* ) and an electrically conductive polymer sheet (90*c*) interposed between said metal foils and having a positive temperature coefficient, said resistive element being formed in L-shape as seen in a plan view.

37. The battery pack according to claim 8, wherein said metal plate constituting said main wall of said another case half is formed with a plurality of ribs or openings.

38. The battery pack according to claim 1, wherein said battery pack is mounted to an electronic device that is a portable telephone or a personal digital assistant.

* * * * *